(12) United States Patent
Asakura et al.

(10) Patent No.: US 8,182,102 B2
(45) Date of Patent: May 22, 2012

(54) TRANSPARENT SUPPORT, OPTICAL FILM, POLARIZING PLATE AND IMAGE DISPLAY DEVICE

(75) Inventors: Tetsuya Asakura, Minami-Ashigara (JP); Takato Suzuki, Minami-Ashigara (JP); Jun Watanabe, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 377 days.

(21) Appl. No.: 12/413,371

(22) Filed: Mar. 27, 2009

(65) Prior Publication Data
US 2009/0244703 A1    Oct. 1, 2009

(30) Foreign Application Priority Data
Mar. 28, 2008 (JP) ................ P2008-088534

(51) Int. Cl.
*G02B 27/00* (2006.01)
(52) U.S. Cl. .................................................. 359/601
(58) Field of Classification Search .......... None
See application file for complete search history.

(56) References Cited

U.S. PATENT DOCUMENTS

| 6,110,595 | A | 8/2000 | Suzuki et al. |
| 6,419,366 | B1 | 7/2002 | Namioka |
| 2004/0012855 | A1 | 1/2004 | Allen et al. |
| 2007/0121211 | A1* | 5/2007 | Watanabe et al. ............. 359/601 |
| 2007/0139781 | A1 | 6/2007 | Inoue et al. |
| 2007/0195431 | A1* | 8/2007 | Asakura et al. ............... 359/707 |
| 2008/0069975 | A1 | 3/2008 | Kato et al. |

FOREIGN PATENT DOCUMENTS

| EP | 1 408 351 A | 4/2004 |
| JP | 2005-156801 A | 6/2005 |

* cited by examiner

*Primary Examiner* — Derek S Chapel
(74) *Attorney, Agent, or Firm* — Birch, Stewart, Kolasch & Birch, LLP

(57) ABSTRACT

Provided is a transparent support including a light-transmitting particle having an average particle diameter of 6 to 20 μm, wherein the transparent support has a thickness of from 20 to 200 μm, the light-transmitting particle is contained in a ratio of 0.5 to 20 mass % based on entire solid content in the transparent support, and the transparent support has an arithmetic average roughness (Ra) of 0.05 μm or less.

16 Claims, 4 Drawing Sheets

TRANSPARENT SUPPORT, OPTICAL FILM, POLARIZING PLATE AND IMAGE DISPLAY DEVICE

BACKGROUND OF THE INVENTION

1. Field of the Invention

The present invention relates to a transparent support, an optical film, a polarizing plate and an image display device.

2. Description of the Related Art

With recent progress toward a large-screen liquid crystal display device (LCD), a liquid crystal display device having disposed thereon an optical film such as antireflection film or light-diffusing sheet is increasing. For example, in various image display devices such as liquid crystal display device (LCD), plasma display panel (PDP), electroluminescent display (ELD) and cathode ray tube display device (CRT), the antireflection film is disposed on the display surface so as to prevent the reduction in contrast due to reflection of outside light or disturbing reflection of an image. Also, the light-diffusing sheet is used for a backlight of a liquid crystal display device.

As for the antireflection film, an antiglare film is being widely used in the market at present. The antiglare film is generally produced by a method of adding an inorganic or organic fine particle to an antiglare layer and thereby providing unevenness to the surface. However, the antiglare film produced by this method suffers from a poor jet-black color of the film surface and sometimes impairs the quality when disposed on the display surface.

On the other hand, there is disclosed a method of imparting unevenness to the substrate itself and providing a hardcoat layer or an antireflection layer thereon to obtain an antiglare film having an antiglare effect without providing a special antiglare layer. For example, a technique of incorporating a fine particle into a substrate film to form a surface uneven profile, thereby imparting an antiglare property to an antireflection film, is disclosed (see, JP-A-2005-156801 (the term "JP-A" as used herein means an "unexamined published Japanese patent application")).

The antireflection film using a fine particle disclosed in JP-A-2005-156801 may be imparted with an antiglare property, but when the produced antireflection film is disposed on an image display device, the screen may suffer from reduction in the contrast or occurrence of glare. Therefore, improvements are demanded.

Also, in the case where the antiglare film of JP-A-2005-156801 is used on the surface of a liquid crystal display device (LCD), if a three band fluorescent lamp is reflected on the display surface, rainbow unevenness appears in the periphery of the reflected fluorescent lamp. In this respect, improvements are demanded.

Furthermore, in recent years, saving of the cost involved in a liquid crystal display device is being strongly demanded. In particular, it is demanded to reduce the number of members, for example, in the case of a member participating in the display, to use a member where functions of a plurality of members are integrated or to form polarizing plates in the front and back sides from a common species.

SUMMARY OF THE INVENTION

An object of the present invention is to provide a transparent support capable of preventing glare and ensuring good contrast ratio when disposed in an image display device, and an optical film and a polarizing plate each using the transparent support.

Another object of the present invention is to provide an image display device assured of good visibility by having the transparent support, optical film or polarizing plate above.

Still another object of the present invention is to provide an optical film capable of contributing to reduction in the number of members at the production of an image display device.

The above-described objects can be attained by the following constitutions.

1. A transparent support comprising:
    a light-transmitting particle having an average particle diameter of 6 to 20 μm,
    wherein
    the transparent support has a thickness of from 20 to 200 μm,
    the light-transmitting particle is contained in a ratio of 0.5 to 20 mass % based on entire solid content in the transparent support, and
    the transparent support has an arithmetic average roughness (Ra) of 0.05 μm or less.

2. The transparent support as described in 1 above, wherein
    a difference between a refractive index of the light-transmitting particle and a refractive index of the transparent support is from 0.001 to 0.05.

3. The transparent support as described in 1 or 2 above, wherein
    the transparent support is a cellulose acylate film.

4. The transparent support as described in 3 above, wherein
    the cellulose acylate film has a multilayer structure comprising a base layer and a surface layer, and
    the light-transmitting particle is contained only in the base layer.

5. The transparent support as described in any one of 1 to 4 above, wherein
    a haze value attributable to an interior of the transparent support is from 10 to 30%, and
    a haze value attributable to a surface of the transparent support is less than 2%.

6. The transparent support as described in any one of 1 to 5 above, wherein
    assuming that an outgoing light intensity of transmitted and scattered light in a normal direction of a transparent support not containing a light-transmitting particle is $I0$,
    $I(0°)/I0$ which is a ratio of $I(0°)$ to $I0$ is from 40 to 98%, wherein $I(0°)$ is an outgoing light intensity in a normal direction of a surface of the transparent support comprising the light-transmitting particle having the average particle diameter of 6 to 20 μm,
    $I(5°)/I0$ which is a ratio of $I(5°)$ to $I0$ is from 0.7 to 5.5%, wherein $I(5°)$ is an outgoing light intensity at a position 5° inclined to a longitudinal direction of a film from the normal direction of the surface of the transparent support comprising the light-transmitting particle having the average particle diameter of 6 to 20 μm, and
    $I(30°)/I0$ which is a ratio of $I(30°)$ to $I0$ is from 0.0005 to 0.003%, wherein $I(30°)$ is an outgoing light intensity at a position 30° inclined to the longitudinal direction of the film from the normal direction of the surface of the transparent support comprising the light-transmitting particle having the average particle diameter of 6 to 20 μm.

7. The transparent support as described in any one of 1 to 6 above, wherein
    a transmitted image clarity by an optical comb of 2.0 mm is from 40 to 70%.

8. An optical film comprising:
    the transparent support described in any one of 1 to 7 above; and
    a hardcoat layer having a thickness of 3 to 15 μm.

9. The optical film as described in 8 above, further comprising:
a low refractive index layer having a refractive index lower than a refractive index of the hardcoat layer.
10. The optical film as described in 9 above, wherein the low refractive index layer contains a fine particle, which is at least one selected from the group consisting of an inorganic fine particle, a hollow inorganic fine particle and a hollow organic resin fine particle.
11. The optical film as described in any one of 8 to 10 above, wherein the hardcoat layer does not contain a particle having an average particle diameter of 6 μm or more.
12. The optical film as described in any one of 8 to 11 above, wherein the refractive index of the hardcoat layer is from 1.45 to 1.55.
13. A polarizing plate comprising:
a polarizing film; and
protective films on both sides of the polarizing film, wherein
at least one of the protective films is the transparent support described in any one of 1 to 7 above.
14. An image display device comprising:
any one member of the transparent support described in any one of 1 to 7 above, the optical film described in any one of 8 to 12 above, and the polarizing plate described in 13 above.

DETAILED DESCRIPTION OF THE INVENTION

Figure 1:
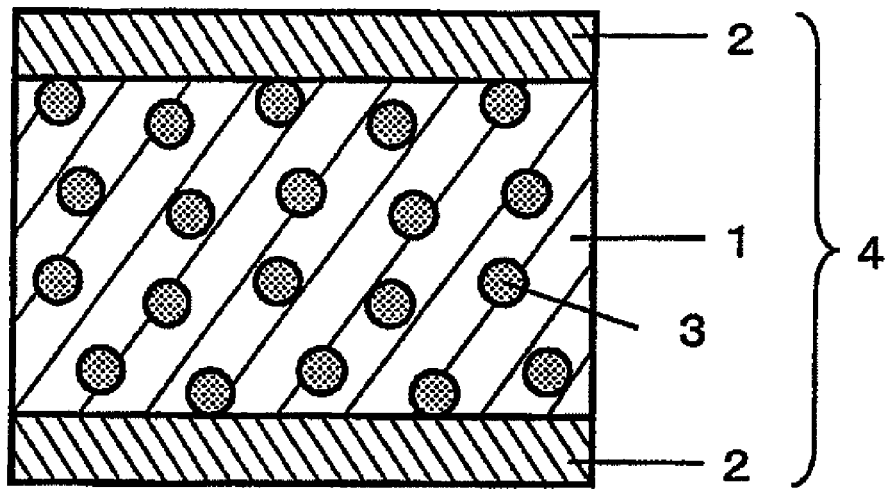
FIG. 1 is a cross-sectional view showing one example of the layer structure of a transparent support.

The best mode for carrying out the present invention is described in detail below, but the present invention is not limited thereto.
The invention of the present invention is a transparent support comprising a light-transmitting particle having an average particle diameter of 6 to 20 μm, wherein the transparent support has a thickness of from 20 to 200 μm, the light-transmitting particle is contained in a ratio of 0.5 to 20 mass % based on entire solid content in the transparent support, and the transparent support has an arithmetic average roughness (Ra) of 0.05 μm or less.

<Light-Transmitting Particle Used in Transparent Support>

The transparent support of the present invention contains a light-transmitting particle so as to impart an internal scattering effect.
The light-transmitting particle may be an organic particle or an inorganic particle. As the particle diameter is less fluctuated, fluctuation in the scattering properties is more reduced and design of the haze value is more facilitated.
The average diameter of the light-transmitting particle is from 6 to 20 μm, preferably from 7 to 15 μm, more preferably from 8 to 12 μm. If the average diameter is less than 6 μm, in the case of using a liquid crystal display device (LCD), when a three band fluorescent lamp is reflected on the display surface, rainbow unevenness appears, whereas if it exceeds 20 μm, when used in LCD, glare is worsened.
The content of the light-transmitting particle in the transparent support is from 0.5 to 20 mass %, preferably from 1 to 15 mass %, more preferably from 2 to 8 mass %. If the content is less than 0.5 mass %, in the case of using LCD, rainbow unevenness appears when a three band fluorescent lamp is reflected on the display surface, whereas if the content exceeds 20 mass %, the contrast is worsened when used in LCD. In the case of a transparent support having a multilayer construction formed by co-casting or co-extrusion, the light-transmitting particle is preferably contained in the base layer to the content above.
As for the average particle diameter of the light-transmitting particle, in both cases where two or more particles are adjacently present in the coating film and where particles are independently present, the average particle diameter indicates a primary particle diameter. However, in the case where aggregating inorganic particles having a primary particle diameter of about 0.1 μm are dispersed in a coating solution as a secondary particle to a size satisfying the particle size of the present invention and then coated, the secondary particle diameter is used as the average particle diameter.
Examples of the inorganic particle which can be used in the present invention include silicon oxide, titanium oxide, aluminum oxide, tin oxide, indium oxide, ITO, zinc oxide, zirconium oxide, antimony oxide, magnesium oxide, calcium carbonate, talc, clay, calcined kaolin, calcined calcium silicate, hydrous calcium silicate, aluminum silicate, magnesium silicate, calcium phosphate, and a composite oxide thereof.
Examples of the organic particle which can be added to the transparent support include a polymethacrylic acid methyl acrylate resin powder, an acryl styrene-based resin powder, a polymethyl methacrylate resin powder, a silicone-based resin powder, a polystyrene-based resin powder, a polycarbonate resin powder, a benzoguanamine-based resin powder, a melamine-based resin powder, a polyolefin-based resin powder, a polyester-based resin powder, a polyamide-based resin powder, a polyimide-based resin powder, and a polyfluorinated ethylene-based resin powder.
Specific examples of the commercially available organic particle include a crosslinked acryl particle (MX-600, MX-1000, MX-1500H, MX-2000 and MR-7G produced by Soken Chemical & Engineering Co., Ltd.; MBX-8 and MBX-12 produced by Sekisui Plastics Co., Ltd.), a crosslinked styrene particle (SBX-6, SBX-8 and SBX-12 produced by Sekisui Plastics Co., Ltd.), a crosslinked acryl styrene particle (SSX-106FB produced by Sekisui Plastics Co., Ltd.), a silicone particle (TOSPEARL 2000B and TOSPEARL 2000B* produced by GE Toshiba Silicones), and a benzoguanamine•formaldehyde condensate (EPOSTAR L15 produced by Nippon Shokubai Co., Ltd.).

Out of these particles, in order to satisfy both good contrast and good antiglare effect without causing rainbow unevenness even when a three band fluorescent lamp is reflected on the display surface in use for a liquid crystal display device (LCD), which is the purposes of the present invention, a light-transmitting particle giving a difference of 0.001 to 0.05 between the refractive index of the transparent support and the refractive index of the light-transmitting particle is preferably selected. The refractive index difference is preferably from 0.002 to 0.04. By limiting the refractive index difference to this range, light scattering generated due to a refractive index difference between the light-transmitting particle and the transparent support can be kept in a given range while ensuring haze large enough to suppress rainbow unevenness and glare, and the reduction in the contrast when laminated to an image display device can be minimized.

The cause of the rainbow unevenness is not clearly known but is presumed as follows. In the case where a three band fluorescent lamp is reflected on the display in a dark room, internally reflected light reflected by a glass plate, a polarizing plate, an electric circuit, a black matrix or the like in the liquid crystal display device comes to appear in the periphery of a specularly reflected image, and this is considered to bring about rainbow unevenness. For preventing this phenomenon, internal scattering or surface scattering of the light scattering layer needs to be increased. However, the increase of internal scattering disadvantageously causes reduction in the display contrast, and the increase of surface scattering raises a problem that denseness of black decreases. By virtue of the thickness, particle diameter, refractive index and filled amount of the present invention, generation of rainbow unevenness due to reflection of a three band fluorescent lamp can be prevented without worsening the display contrast.

Here, the refractive index of the transparent support can be quantitatively evaluated by directly measuring the refractive index with an Abbe refractometer or by a spectral reflection spectrum or spectral ellipsometry measurement. The refractive index of the light-transmitting particle is determined by dispersing light-transmitting particles in an equal amount in solvents prepared by changing the mixing ratio of two kinds of solvents differing in the refractive index and thereby varied in the refractive index, measuring the turbidity, and reading the refractive index of the solvent on giving a minimum turbidity by an Abbe refractometer.

In the present invention, the light-transmitting particle suitably used in the transparent support is preferably surface-treated so as to control the aggregation or dispersion in the film after film formation. The surface treatment is performed, for example, by treating the light-transmitting particle surface with an organic compound. Examples of the organic compound which can be used here include conventionally known surface modifiers for inorganic fillers, such as metal oxide and inorganic pigment, and these are described, for example, in *Ganryo Bunsan Anteika to Hyomen Shori Gijutsu•Hyoka (Technology•Evaluation for Dispersion Stabilization and Surface Treatment of Pigment)*, Chap. 1, Gijutsu Joho Kyokai (2001). Specific examples thereof include an organic compound containing a polar group having affinity for the light-transmitting particle surface, and a coupling compound.

Examples of the polar group having affinity for the light-transmitting particle surface include a carboxy group, a phosphono group, a hydroxy group, a mercapto group, a cyclic acid anhydride group and an amino group. A compound having at least one of these polar groups within the molecule is preferred. Examples thereof include a long-chain aliphatic carboxylic acid (e.g., stearic acid, lauric acid, oleic acid, linoleic acid, linolenic acid), a polyol compound (e.g., pentaerythritol triacrylate, dipenta-erythritol pentaacrylate, ECH (epichlorohydrin)-modified glycerol), a phosphono group-containing compound [e.g., EO (ethylene oxide)-modified phosphoric acid], and an alkanolamine [e.g., ethylenediamine EO adduct (5 mol)].

The coupling compound includes conventionally known organic metal compounds, and examples thereof include a silane coupling agent, a titanate coupling agent, and an aluminate coupling agent, with a silane coupling agent being most preferred. Specifically, coupling compounds described, for example, in Shinzo Yamashita and Tosuke Kaneko, *Kakyo-zai Handbook (Crosslinking Agent Handbook)*, Taisei Sha (1981) may be used.

At the surface treatment, two or more kinds of these compounds may be used in combination.

The shape of the light-transmitting particle for use in the present invention may be either truly spherical or amorphous. One kind of a particle may be used alone, or two or more kinds of particles may be used in combination. As for the particle size distribution, in view of the control of haze value and diffusion and the homogeneity of coated surface state, a monodisperse particle is preferred. The CV value, which represents a uniformity of particle diameter, is preferably 15% or less, more preferably 13% or less, still more preferably 10% or less. Furthermore, when a particle having a particle diameter 33% or more larger than the average particle diameter is defined as a coarse particle, the percentage of this coarse particle in the number of all particles is preferably 1% or less, more preferably 0.8% or less, still more preferably 0.4% or less. It is not preferable to contain too many coarse particles because surface roughening is emphatically recognized and thereby the asperity is worsened.

Also, for example, when a particle having a particle diameter 16% or more smaller than the average particle diameter is defined as a microparticle, the percentage of the microparticle in the number of all particles is preferably 10% or less, more preferably 6% or less, still more preferably 4% or less. The particle having such a particle diameter distribution can be obtained by performing classification after a normal synthesis reaction, and when the number of classifications is increased or the level of classification is elevated, a particle having a more preferred distribution can be obtained.

Any measuring method can be applied as a measuring method of the particle diameter of the light-transmitting particles, as long as it is a method for measuring a particle diameter of particles. For example, the particle size distribution of the particle is measured by a Coulter counter method, and the measured distribution is converted into a particle number distribution. The average particle diameter is calculated from the obtained particle distribution.

<Transparent Support>

The transparent support for use in the present invention is described below. Specific examples of the transparent support for use in the present invention (the material as a main component (in a ratio of 51 to 99 mass %) constituting the transparent support) include a cellulose acylate (e.g., triacetyl cellulose, diacetyl cellulose, propionyl cellulose, butyryl cellulose, acetylpropionyl cellulose, nitrocellulose), polyamide, polycarbonate, a polyester (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), a polystyrene (e.g., syndiotactic polystyrene), a polyolefin (e.g., polypropylene, polyethylene, polymethylpentene, polycycloalkane), polysulfone, polyethersulfone, polyallylate, polyetherimide, polymethyl methacrylate, and polyether ketone. Above all, triacetyl cellulose, polycarbonate, polyethylene terephthalate and polyethylene naphthalate are preferred.

As for the transparent protective film which is preferably used in a polarizing plate, the matters of importance are the balance of hydrophobicity/hydrophilicity of the film, the lamination property to a vinyl alcohol-based film of the polarizing film, and the uniformity of optical properties in the entire film plane, and a particularly preferred film is a cellulose acylate film. The cellulose acylate film is a film containing at least a cellulose acylate and a light-transmitting particle having an average particle diameter of 6 to 20 μm, wherein a ratio of the cellulose acylate based on entire solid content is 50 mass % or more. Above all, a cellulose fatty acid ester (cellulose acylate) film is preferred, and a film containing a cellulose acylate, a plasticizer and a light-transmitting particle is more preferred.

As for the surface unevenness shape of the transparent support, the arithmetic average roughness (Ra) is 0.05 μm or less, more preferably 0.02 μm or less. When Ra is 0.05 μm or less, the transparent support can be handled in the same way as a normal transparent support not containing a light-transmitting particle, and handling in view of layer design or production of the hardcoat layer becomes easy. The arithmetic average roughness Ra can be measured in accordance with JIS B0601 (1994, 2001).

Assuming that the outgoing light intensity of transmitted and scattered light in the normal direction of a transparent support not containing a light-transmitting particle is I0, I(0°)/I0 which is a ratio of I(0°) to I0 is preferably from 40 to 98%, more preferably from 45 to 80%, and most preferably from 50 to 70%, wherein I(0°) is the outgoing light intensity in the normal direction of the surface of the transparent support of the invention comprising the light-transmitting particle having the average particle diameter of 6 to 20 μm. When this ratio is from 40 to 98%, white brightness at the white display time does not decrease and the display screen is advantageously prevented from darkening.

Also, I(5°)/I0 which is a ratio of I(5°) to I0 is preferably from 0.7 to 5.5%, more preferably from 1.0 to 4.0%, and most preferably from 1.5 to 3.0%, wherein I(5°) is the outgoing light intensity at the position 5° inclined to the longitudinal direction of the film from the normal direction of the surface of the transparent support of the invention comprising the light-transmitting particle having the average particle diameter of 6 to 20 μm. When this ratio is from 0.7 to 5.5%, glaring is not generated even in a high-definition liquid crystal display device of 150 ppi (150 pixels/inch) and advantageously, no character blurring occurs.

I(30°)/I0 which is a ratio of I(30°) to I0 is preferably from 0.0005 to 0.003%, more preferably from 0.0007 to 0.002%, and most preferably from 0.0009 to 0.0015%, wherein I(30°) is the outgoing light intensity at the position 30° inclined to the longitudinal direction of the film from the normal direction of the surface of the transparent support of the invention comprising the light-transmitting particle having the average particle diameter of 6 to 20 μm. When this ratio is from 0.0005 to 0.003%, black brightness at the black display time is not increased and particularly when a dark scene of a movie or the like is viewed in a low-illuminance environment, deep black can be expressed without allowing the black to be white-tinged.

The ratios I(0°)/I0, I(5°)/I0 and I(30°)/I0 are preferably from 40 to 98%, from 0.70 to 5.5% and from 0.0005 to 0.003%, more preferably from 45 to 80%, from 1.0 to 4.0% and from 0.0007 to 0.002%, still more preferably from 50 to 70%, from 1.5 to 3.0% and from 0.0009 to 0.0015%, respectively.

The internal haze value (the value obtained by subtracting the surface haze value from the entire haze value) of the transparent support is preferably from 10 to 30%, more preferably form 15 to 29%, and most preferably from 20 to 28%. Within this range, a function of making the pattern, color unevenness, brightness unevenness, glare or the like of the liquid crystal panel to be less perceivable by internal scattering or enlarging the viewing angle by scattering can be imparted. In the case of a transparent support having a multilayer construction formed by co-casting or co-extrusion, the internal haze is attributable to the addition of a light-transmitting particle to the base layer.

The surface haze value of the transparent support is preferably less than 2%, more preferably less than 1%, and most preferably less than 0.5%. Within this range, the transparent support can be handled in the same way as a normal transparent support not containing a light-transmitting support. If an antiglare particle is not added to a hardcoat layer, a clear film having internal scattering is formed. By adding an antiglare particle to the hardcoat layer, an antiglare film having internal scattering can be produced. Owing to internal scattering imparted to the transparent support, antiglare effect (adjusted by a hardcoat layer) and internal scattering can be independently controlled, and design of a surface film matching various LCD properties is more facilitated.

The transmitted image clarity of the transparent support as measured using an optical comb having a slit width of 2.0 mm is preferably from 40 to 70%, more preferably from 45 to 70%, and most preferably from 50 to 65%. Within this range, a clear and good image can be viewed through the transparent support and at the same time, the pattern, color unevenness, brightness unevenness, glare or the like of the liquid crystal panel can be made less perceivable.

The cellulose acylate film is described below as an example.

Figure 2:
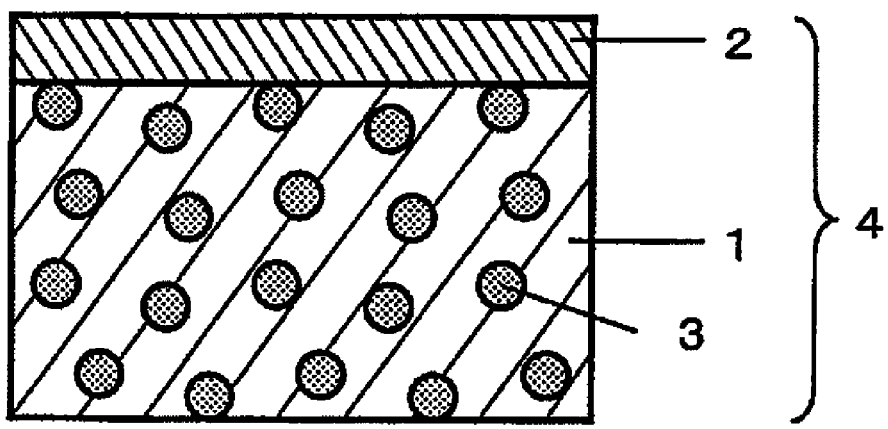
FIG. 2 is a cross-sectional view showing one example of the layer structure of a transparent support.

The cellulose acylate film preferably has a multilayer structure comprising a base layer and a surface layer, and in this case, the light-transmitting particle is preferably added only to the base layer. The surface layer may be stacked only on one side of the base layer or may be stacked on both sides of the base layer. That is, one embodiment is, as shown in FIG. 1, a three-layer structure composed of a base layer 1 and surface layers 2 stacked on both surfaces thereof, and another embodiment is, as shown in FIG. 2, a two-layer structure composed of a base layer 1 and a surface layer 2 stacked on one surface thereof. Furthermore, the surface layer is stacked on a portion located at a surface, and other layers may be stacked between the base layer and the surface layer.

In a preferred embodiment of such a cellulose acylate film, the light-transmitting particle is added only to the base layer and the light-transmitting particle is not added to the surface layer. That is, internal scattering is imparted by adding the light-transmitting particle only to the base layer, and planarity of the cellulose acylate film surface and transparency of the entire cellulose acylate film are ensured by not adding the light-transmitting particle to the surface layer (in the case of stacking other layers in-between, including the intermediate layers). In order to reduce the haze attributable to the transparent support surface to be less than 2%, a three-layer structure where a surface layer not containing the light-transmitting particle (in the case of stacking other layers in-between, including the intermediate layers) is stacked on both sides of a base layer, is more preferred.

The thickness of the cellulose acylate film is preferably from 20 to 200 μm, more preferably from 30 to 120 μm, and the ratio of the thickness of the surface layer (when stacked on both surfaces, the total thickness) to the thickness of the base layer of the cellulose acylate film is preferably from 0.25 to 50%, more preferably from 0.6 to 40%. If the ratio of the surface layer thickness is less than 0.25%, a uniform layer can be hardly formed, whereas if the ratio of the surface layer thickness exceeds 50%, the advantage of layer stacking may be impaired.

In producing the cellulose acylate film for use in the present invention, a method of casting and stacking layers, such as co-casting (simultaneous multilayer casting), sequential casting and coating, can be used. In the case of producing the cellulose acylate film by a co-casting method or a sequential casting method, a dope for each layer is prepared. The co-casting method is a casting method where respective layers are simultaneously cast by extruding dopes from a casting geeser of simultaneously extruding dopes for respective layers (three or more layers) on a casting support (band or drum) through separate slits or the like and the stack is separated from the support at an appropriate time and dried to form a film.

The sequential casting method is a casting method where a dope for casting a first layer is extruded and cast on a casting support from a casting geeser, after drying or not drying it, a dope for casing a second layer is cast and extruded thereon from the casting geeser, dopes for third and subsequent layers are sequentially cast and stacked in the same manner, and the stack is separated from the support at an appropriate time and dried to form a film.

The coating method in general is a method where a base layer film is formed by a solution film-forming method, a coating solution for forming a surface layer is prepared, and the coating solution is coated and dried on both surfaces of the film sequentially or simultaneously by using an appropriate coater to form a film having a stack structure.

In this way, any method of these co-casting method, sequential casting method and coating method may be used for the production of the cellulose acylate film. However, in general, the coating method requires a large drying load after coating, and the sequential casting method involves a complicated process and hardly allows the film to maintain its planarity, whereas in the co-casting method, the process is simple, the productivity is high, and the film planarity can be relatively easily obtained. Therefore, the cellulose acylate film is preferably produced by the co-casting method. In the case of production by the co-casting method, the light-transmitting particle contained in the base layer may diffuse into the surface layer. The amount of the particle migrated into the surface layer is preferably 10 mass % or less, more preferably 5 mass % or less, still more preferably 1 mass % or less, based on the particle in the base layer. As for the migration of the particle into the surface layer, diffusion of the particle can be reduced by increasing the viscosity of the dopes for the base layer and surface layer.

Figure 3:
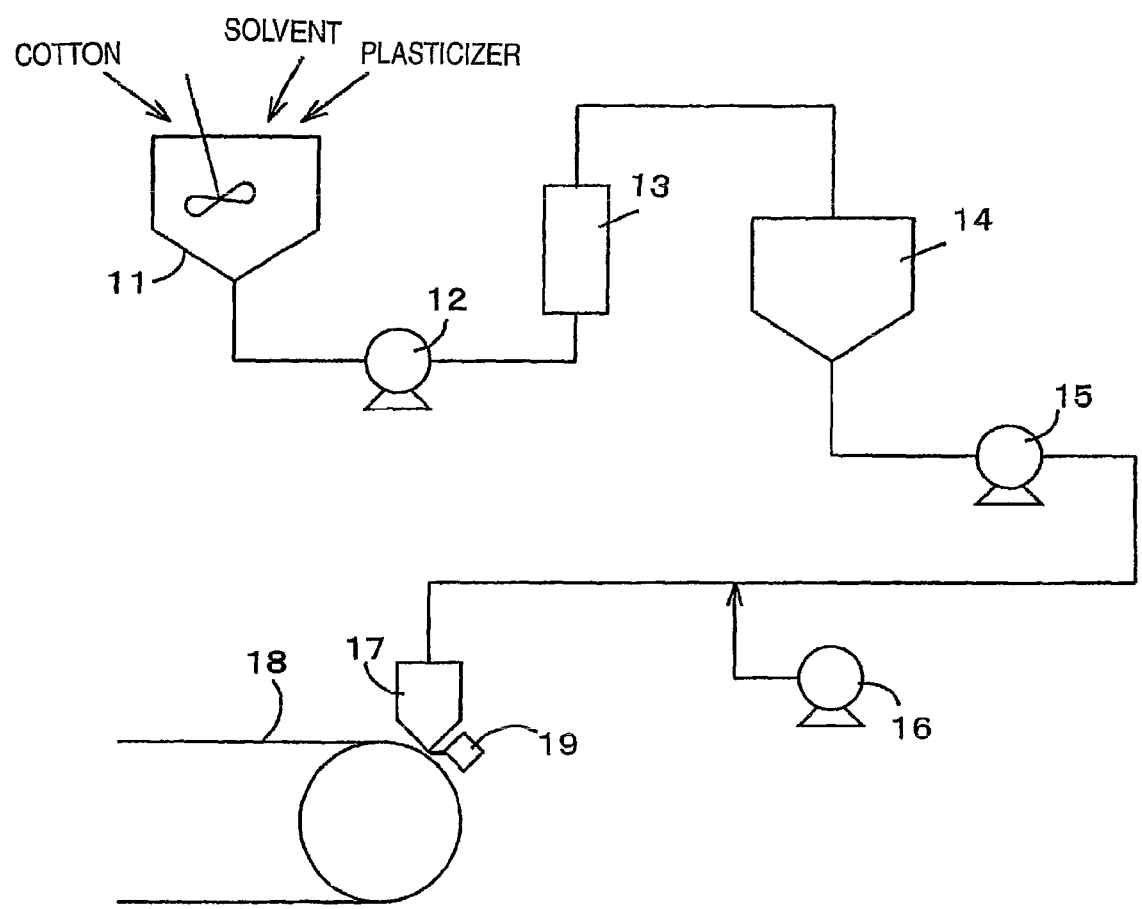
FIG. 3 is a view showing a solution film-forming apparatus using a casting band.

The apparatus for producing the cellulose acylate film may be a solution film-forming apparatus using a casting band with the surface being mirror-processed, or a solution film-forming apparatus using a casting drum. FIG. 3 shows a solution film-forming apparatus using a casting band, and FIG. 4 shows a solution film-forming apparatus using a casting drum.

In the band-type solution film-forming apparatus shown in FIG. 3, 11 is a stirring machine into which cotton, a plasticizer and a solvent are charged. The stirring machine 11 is connected to a casting die 17 through a transfer pump 12, a filtration device 13, a stock tank 14, a casting liquid-feed pump 15, and an additive injection pump 16 for adding a light-transmitting particle, a dye, an ultraviolet absorber (UV agent) and the like. Below the casting die 17, a casting band 18 and a reduced pressure chamber 19 are provided.

Figure 4:
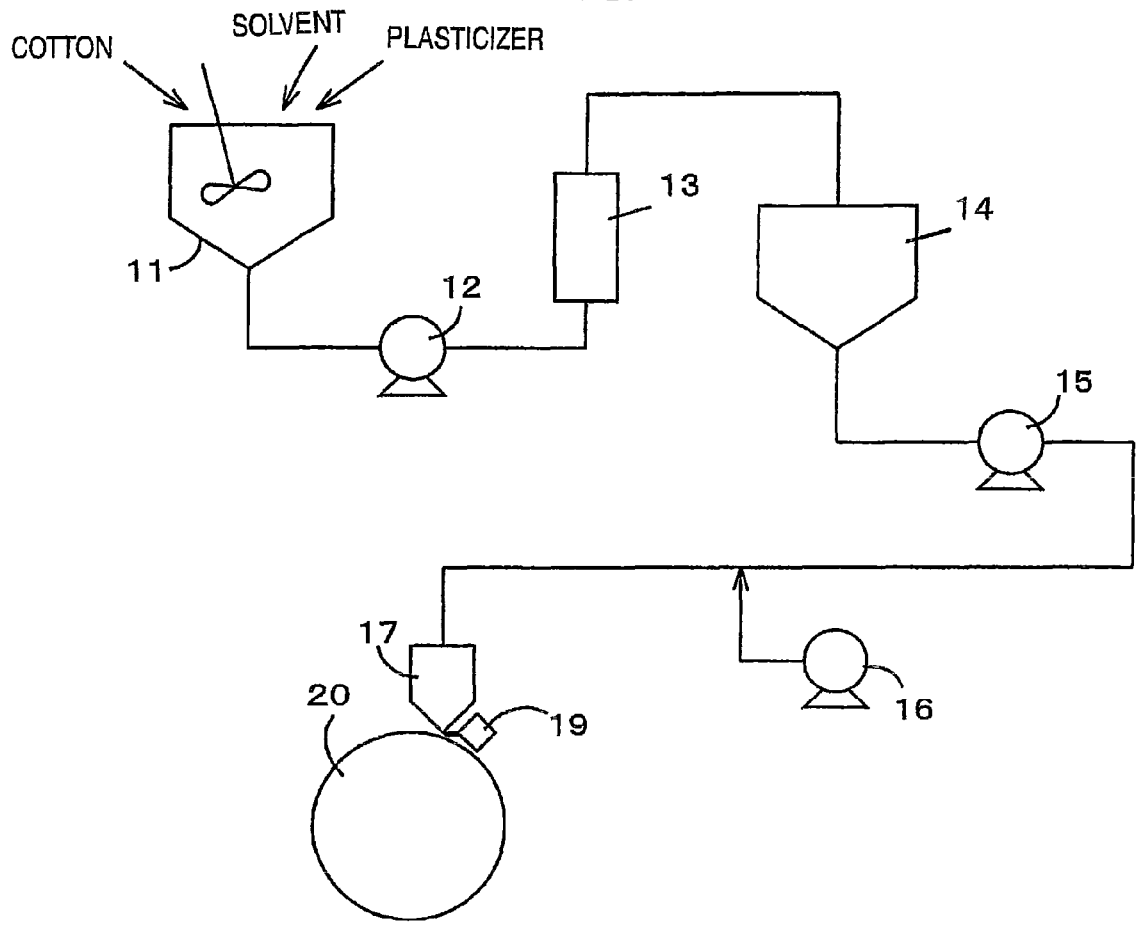
FIG. 4 is a view showing a solution film-forming apparatus using a casting drum.

In the drum-type solution film-forming apparatus shown in FIG. 4, 20 is a casting drum and this is provided in place of the casting band 18 in the band-type solution film-forming apparatus. Incidentally, the stirring machine 11, the transfer pump 12, the filtration device 13, the stock tank 14, the casting liquid-feed pump 15, the additive injection pump 16 and the casting die 17 each has the same construction as in FIG. 3.

Figure 5:
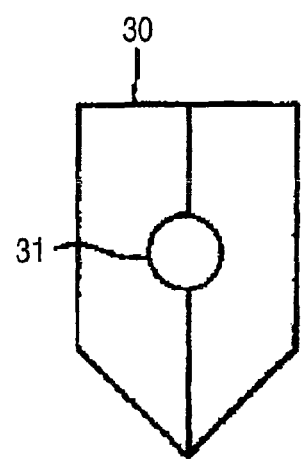
FIG. 5 is a view showing a casting die for film-forming a single-layer film, which is used in a sequential casting method.
Figure 6:
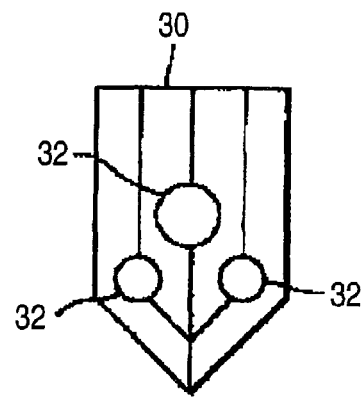
FIG. 6 is a view showing a multi-manifold type co-casting die.
Figure 7:
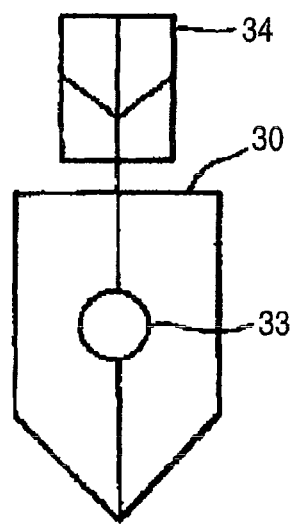
FIG. 7 is a view showing a feed-block type co-casting die.

As for the casting die, those shown in FIGS. 5, 6 and 7 may be used.

FIG. 5 is a casting die used for film-forming a single-layer film, which is used in the sequential casting method, and in this casting die 30, one manifold 31 is formed. FIG. 6 is a multi-manifold type co-casting die, and this co-casting die 30 where three manifolds 32 are formed enables film-formation of a film having a three-layer construction. FIG. 7 is a feed-block type co-casting die, and in this co-casting die 30, not only a manifold 33 is formed but also a feed block 34 is provided, where a dope made to comprise a plurality of layers (in FIG. 7, three layers) after confluence through the feed block 34 is cast.

In these casting dies, a coat hunger die is used, but the die is not limited thereto and may be a die having other shapes, such as T-die.

[Cellulose Acylate]

Examples of the cellulose which is a raw material of the cellulose acylate film used as a transparent protective film include cotton linter, kenaf and wood pulp (e.g., hardwood pulp, softwood pulp). A cellulose acylate obtained from any raw material cellulose may be used and depending on the case, a mixture of raw material celluloses may be used.

In the present invention, the cellulose acylate is produced through esterification from a cellulose, but the particularly preferred cellulose above is not used as it is and the linter, kenaf or pulp is purified and then used.

In the present invention, the cellulose acylate is preferably a carboxylic acid ester of cellulose, having a total carbon number of 2 to 22.

The acyl group having a carbon number of 2 to 22 in the preferable cellulose acylate for use in the present invention is not particularly limited and may be an aliphatic acyl group or an aromatic acyl group. Examples of the cellulose acylate include an alkyl carbonyl ester of cellulose, an alkenyl carbonyl ester of cellulose, a cycloalkylcarbonyl ester of cellulose, an aromatic carbonyl ester of cellulose, and an aromatic alkylcarbonyl ester of cellulose, and these esters each may further have a substituted group. Preferred examples of the acyl group include an acetyl group, a propionyl group, a butanoyl group, a heptanoyl group, a hexanoyl group, an octanoyl group, a cyclohexanecarbonyl group, an adamantanecarbonyl group, a phenylacetyl group, a benzoyl group, a naphthylcarbonyl group, a (meth)acryloyl group and a cinnamoyl group. Among these acyl groups, more preferred are propionyl, butanoyl, pentanoyl, hexanoyl, cyclohexanecarbonyl, phenylacetyl, benzoyl and naphthylcarbonyl.

The synthesis method of the cellulose acylate is described in detail in *JIII Journal of Technical Disclosure*, No. 2001-1745, page 9 (issued on Mar. 15, 2001 by Japan Institute of Invention and Innovation).

The cellulose acylate suitably used in the present invention is preferably a cellulose acylate where the substitution degrees to the hydroxyl group of cellulose satisfy the following mathematical formulae (7) and (8):

$$2.3 \leq SA'+SB' \leq 3.0 \quad \text{Mathematical Formula (7)}$$

$$0 \leq SA' \leq 3.0 \quad \text{Mathematical Formula (8)}$$

In the formulae above, SA' represents the substitution degree of the acetyl group substituted to the hydrogen atom of the hydroxyl group in the cellulose, and SB' represents the substitution degree of the acyl group having a carbon number of 3 to 22 substituted to the hydrogen atom of the hydroxyl group in the cellulose. Incidentally, SA represents an acetyl group substituted to the hydrogen atom of the hydroxyl group in the cellulose, and SB represents an acyl group having a carbon number of 3 to 22 substituted to the hydrogen atom of the hydroxyl group in the cellulose.

The β-1,4-bonded glucose unit constituting the cellulose has a free hydroxyl group at the 2-position, 3-position and 6-position. The cellulose acylate is a polymer where these hydroxyl groups are partially or entirely esterified by an acyl group. The acyl substitution degree means a rate of the cellulose being esterified at each of the 2-position, 3-position and 6-position (100% esterification at each position corresponds to a substitution degree of 1). In the present invention, the sum total (SA'+SB') of the substitution degrees of SA and SB is preferably from 2.6 to 3.0, more preferably from 2.80 to 3.00. The substitution degree (SA') of SA is preferably from 1.4 to 3.0, more preferably from 2.3 to 2.9.

At the same time, the substitution degree preferably satisfies the following mathematical formula (9):

$$0 \leq SB'' \leq 1.2 \quad \text{Mathematical Formula (9)}$$

In the formula above, SB'' represents an acyl group having a carbon number of 3 or 4 substituted to the hydrogen atom of the hydroxyl group in the cellulose.

In SB'', the substituent to the hydroxyl group at the 6-position preferably occupies 28% or more, more preferably 30% or more, still more preferably 31% or more, yet still more preferably 32% or more. The preferred cellulose acylate film also includes a cellulose acylate film where the sum total of the substitution degrees of SA' and SB'' at the 6-position of the cellulose acrylate is 0.8 or more, more preferably 0.85 or more, still more preferably 0.90 or more. In the case of such a cellulose acylate film, a solution having preferred solubility can be produced and in particular, a good solution can be produced with a chlorine-free organic solvent.

The substitution degree is determined by calculation after measuring the bonding degree of a fatty acid bonded to the hydroxyl group in the cellulose. As for the measuring method, the bonding degree may be measured in accordance with ASTM D-817-91 and ASTM D-817-96. Also, the substitution state of the acyl group to the hydroxyl group is measured by the $^{13}$C NMR method.

The cellulose acylate film preferably comprises a cellulose acylate in which the polymer components constituting the film substantially satisfy mathematical formulae (7) and (8). The "substantially" means 55 mass % or more (preferably 70 mass % or more, more preferably 80 mass % or more) of all polymer components. One cellulose acylate may be used alone, or two or more kinds of cellulose acylates may be used in combination.

The polymerization degree of the cellulose acylate preferably used in the present invention is, in terms of the viscosity average polymerization degree, from 200 to 700, preferably from 230 to 550, more preferably from 230 to 350, still more preferably from 240 to 320. The average polymerization degree can be measured by the limiting viscosity method of Uda, et al. (Kazuo Uda and Hideo Saito, *JOURNAL OF THE SOCIETY OF FIBER SCIENCE AND TECHNOLOGY,* *JAPAN,* Vol. 18, No. 1, pp. 105-120 (1962)). Furthermore, this is described in detail in JP-A-9-95538.

The number average molecular weight Mn of the cellulose acylate is preferably from $7 \times 10^4$ to $25 \times 10^4$, more preferably from $8 \times 10^4$ to $15 \times 10^4$. The ratio Mw/Mn to the mass average molecular weight Mw of the cellulose acylate is preferably from 1.0 to 5.0, more preferably from 1.0 to 3.0. The average molecular weight and molecular weight distribution of the cellulose acylate can be measured using a high-performance liquid chromatography. From the results obtained, Mn and Mw are calculated and then, Mw/Mn can be calculated.

The cellulose acylate film for use in the present invention is preferably a film containing at least one cellulose acylate satisfying mathematical formulae (7) and (8) and at least one plasticizer [preferably a plasticizer described later where the octanol/water partition coefficient (log P value) is between 0 and 10].

[Plasticizer]

The plasticizer for use in the present invention is a component added for imparting flexibility to the cellulose acylate film and enhancing the dimensional stability and moisture resistance. The preferred plasticizer includes a plasticizer which has a boiling point of 200° C. or more and is liquid at 25° C. or which is a solid having a melting point of 25 to 250° C., more preferably a plasticizer which has a boiling point of 250° C. or more and is liquid at 25° C. or which is a solid having a melting point of 25 to 200° C. In the case where the plasticizer is a liquid, the purification thereof is usually performed by distillation under reduced pressure, but a higher vacuum is more preferred and the plasticizer for use in the present invention is preferably a compound having a vapor pressure at 200° C. of 1,333 Pa or less, more preferably 667 Pa or less, still more preferably from 1 to 133 Pa.

As for the plasticizer which is preferably added, a phosphoric acid ester, a carboxylic acid ester, a polyol ester or the like having physical properties within the above-described ranges is used.

Examples of the phosphoric acid ester include triphenyl phosphate (TPP), tricresyl phosphate, cresyl diphenyl phosphate, octyl diphenyl phosphate, diphenyl-biphenyl phosphate, trioctyl phosphate and tributyl phosphate.

Representative examples of the carboxylic acid ester include a phthalic acid ester and a citric acid ester. Examples of the phthalic acid ester include dimethyl phthalate, diethyl phthalate, dibutyl phthalate, dioctyl phthalate, diphenyl phthalate and diethyl hexyl phthalate. Examples of the citric acid ester include O-acetyl triethyl citrate, O-acetyl tributyl citrate, acetyl triethyl citrate, and acetyl tributyl citrate.

These preferred plasticizers are a liquid at 25° C. except for TPP (melting point: about 50° C.) and have a boiling point of 250° C. or more.

Other examples of the carboxylic acid ester include butyl oleate, methyl acetyl ricinoleate, dibutyl sebacate and various trimellitic acid esters. Examples of the glycolic acid ester include triacetin, tributyrin, butyl phthalyl butyl glycolate, ethyl phthalyl ethyl glycolate, methyl phthalyl ethyl glycolate, butyl phthalyl butyl glycolate, methyl phthalyl methyl glycolate, propyl phthalyl propyl glycolate, butyl phthalyl butyl glycolate, and octyl phthalyl octyl glycolate.

In addition, plasticizers described, for example, in JP-A-5-194788, JP-A-60-250053, JP-A-4-227941, JP-A-6-16869, JP-A-5-271471, JP-A-7-286068, JP-A-5-5047, JP-A-11-80381, JP-A-7-20317, JP-A-8-57879, JP-A-10-152568 and JP-A-10-120824 may also be preferably used. In these patent publications, not only examples of the plasticizer but also preferred utilization methods or properties of the plasticizer are abundantly described, and these may be preferably employed also in the present invention.

Other preferred examples of the plasticizer include (di) pentaerythritol esters described in JP-A-11-124445, glycerol esters described in JP-A-11-246704, diglycerol esters described in JP-A-2000-63560, citric acid esters described in JP-A-11-92574, substituted phenylphosphoric acid esters described in JP-A-11-90946, and ester compounds containing an aromatic ring and a cyclohexane ring described in JP-A-2003-165868.

Furthermore, in the present invention, a plasticizer having an octanol/water partition coefficient (log P value) between 0 and 10 is preferably used in particular. A plasticizer in this range is preferred, because when the logP value of the compound is 10 or less, compatibility with cellulose acylate is good and the film is free from troubles such as white turbidity or powdery bloom, and when the logP value is 0 or more, the hydrophilicity is not excessively high and a problem such as worsening of the water resistance of the cellulose acylate film is hardly caused. The logP value is more preferably between 1 and 8, still more preferably between 2 and 7.

The octanol/water partition coefficient (logP value) can be measured by a shake flask method described in JIS (Japanese Industrial Standards) Z7260-107 (2000). In place of the actual measurement, the octanol/water partition coefficient (logP value) can also be estimated by a chemically computational method or an empirical method. Preferred examples of the computational method include the Crippen's fragmentation method [see, *J. Chem. Inf. Comput. Sci.*, Vol. 27, page 21 (1987)], the Viswanadhan's fragmentation method [see, *J. Chem. Inf. Comput. Sci.*, Vol. 29, page 163 (1989)], and the Broto's fragmentation method [see, *Eur. J. Med. Chem.-Chim. Theor.*, Vol. 19, page 71 (1984)]. Above all, the Crippen's fragmentation method is more preferred. In the case where the logP value of a certain compound varies depending on the measuring method or calculating method, whether the compound is within the range of the present invention or not is preferably judged by the Crippen's fragmentation method.

A polymer plasticizer containing a resin component having a molecular weight of 1,000 to 100,000 is also preferably used. Examples thereof include a polyester and/or a polyether described in JP-A-2002-22956, a polyester ether, a polyester urethane and a polyester described in JP-A-5-197073, a copolyester ether described in JP-A-2-292342, and an epoxy resin and a novolak resin described in JP-A-2002-146044.

One of these plasticizers may be used alone, or two or more kinds thereof may be mixed and used. The amount of the plasticizer added is preferably from 2 to 30 parts by mass, more preferably from 5 to 20 parts by mass, per 100 parts by mass of the cellulose acylate.

[Ultraviolet Inhibitor]

In the cellulose acylate film, an ultraviolet inhibitor is preferably further added so as to enhance the light fastness of the film itself or prevent deterioration of a polarizing plate or an image display member such as liquid crystal compound of a liquid crystal display device.

The ultraviolet absorber preferably has excellent ability of absorbing ultraviolet light at a wavelength of 370 nm or less from the standpoint of preventing deterioration of the liquid crystal and preferably exhibits as little absorption as possible for visible light at a wavelength of 400 nm or more in view of good image display property. In particular, the transmittance at 370 nm is preferably 20% or less, more preferably 10% or less, still more preferably 5% or less. Examples of such an ultraviolet absorber include, but are not limited to, an oxybenzophenone-based compound, a benzotriazole-based compound, a salicylic acid ester-based compound, a benzophenone-based compound, a cyanoacrylate-based compound, a nickel complex salt-based compound, and the above-described polymer ultraviolet absorbing compound containing an ultraviolet absorbing group. Two or more kinds of ultraviolet absorbers may be used.

The ultraviolet absorber may be added to the dope after dissolving it in an organic solvent such as alcohol, methylene chloride and dioxolane or may be directly added to the dope composition. An ultraviolet absorber incapable of dissolving in an organic solvent, like an inorganic powder, is dispersed in a mixture of an organic solvent and a cellulose acylate by using a dissolver or a sand mill and then added to the dope.

In the present invention, the amount of the ultraviolet absorber used is from 0.1 to 5.0 parts by mass, preferably from 0.5 to 2.0 parts by mass, more preferably from 0.8 to 2.0 parts by mass, per 100 parts by mass of the cellulose acylate.

[Other Additives]

Furthermore, in the cellulose acylate composition, other various additives (for example, a deterioration inhibitor (e.g., antioxidant, peroxide decomposing agent, radical inhibitor, metal inactivating agent, acid scavenger, amine), an optical anisotropy controlling agent, a release agent, an antistatic agent and an infrared absorber) according to usage may be added in each preparation step. Such an additive may be either a solid or an oily product. That is, the melting point or boiling point thereof is not particularly limited. As for the infrared absorber, those described, for example, in JP-A-2001-194522 may be used.

These additives may be added at any stage in the dope preparation step, or a step of adding the additives may be provided as a final preparation step of the dope preparation process. The amount of each material added is not particularly limited as long as its function can be exerted. In the case where the cellulose acylate film is composed of multiple layers, the kind or amount added of the additive may differ among respective layers. This is a conventionally known technique described, for example, in JP-A-2001-151902. As for these additives including the ultraviolet absorber, the materials described in detail in *JIII Journal of Technical Disclosure*, No. 2001-1745, pp. 16-22 (issued on Mar. 15, 2001 by Japan Institute of Invention and Innovation) are preferably used.

Such an additive is preferably used in an appropriate amount within the range from 0.001 to 20 mass % based on the entire cellulose acylate composition.

(Solvent)

The organic solvent in which the cellulose acylate is dissolved is described below. The organic solvent used includes conventionally known organic solvents and, for example, a solvent having a dissolution parameter of 17 to 22 is preferred. The dissolution parameter indicates a dissolution parameter described, for example, in J. Brandrup, E. H., et al., *Polymer Handbook*, 4th ed., VII/671 to VII/714. Examples thereof include a chloride of lower aliphatic hydrocarbon, a lower aliphatic alcohol, a ketone having a carbon atom number of 3 to 12, an ester having a carbon atom number of 3 to 12, an ether having a carbon atom number of 3 to 12, aliphatic hydrocarbons having a carbon atom number of 5 to 8, aromatic hydrocarbons having a carbon number of 6 to 12, and fluoroalcohols (for example, compounds described in JP-A-8-143709, paragraph [0020] and JP-A-11-60807, paragraph [0037]).

As for the cellulose acylate solution, the cellulose acylate is preferably dissolved in an organic solvent to a concentration of 10 to 30 mass %, more preferably from 13 to 27 mass %, still more preferably from 15 to 25 mass %. The cellulose acylate solution may be prepared to such a cellulose acylate concentration by a method of dissolving the cellulose acylate to a predetermined concentration in the dissolving step, a method of previously preparing a low-concentration solution (for example, in a concentration of 9 to 14 mass %) and then forming it into a solution having a predetermined high concentration in the concentration step described later, or a method of previously preparing a high-concentration cellulose acylate solution and then adding various additives to obtain a cellulose acylate solution having a predetermined low concentration. There is no problem in particular as long as a cellulose acylate solution is prepared to the concentration of the present invention by any of these methods.

[Preparation of Dope]

In the preparation of the cellulose acylate solution (dope), the dissolution method is not particularly limited as described above, and the dope is prepared by a room-temperature dissolution method, a cooling dissolution method, a high-temperature dissolution method or a combination thereof. As regards these methods, the preparation method of a cellulose acylate solution is described, for example, in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017 and JP-A-11-302388. The techniques described in these patent publications regarding the method of dissolving the cellulose acylate in an organic solvent can be appropriately applied also to the present invention within the scope of the present invention. The dope is prepared by a method described in detail in these patent publications and, in particular, as for the non-chlorine type solvent system, the dope is prepared by the method described in detail in *JIII Journal of Technical Disclosure*, No. 2001-1745 supra, pp. 22-25. The dope solution of cellulose acylate is usually further subjected to solution concentration and filtration, and these are described in detail similarly in *JIII Journal of Technical Disclosure*, No. 2001-1745 supra, page 25. Incidentally, in the case of dissolving the cellulose acylate at a high temperature, the temperature is in most cases not lower than the boiling point of the organic solvent used and at this time, the system is used in a pressurized state.

In the cellulose acylate solution, the viscosity and dynamic storage modulus of the solution each is preferably in a specific range. The static non-Newtonian viscosity n*(Pa·sec) at 40° C. and the storage modulus G' (Pa) at 5° C. are determined by subjecting 1 mL of a sample solution to a measurement using a rheometer (CLS 500) with Steel Cone (both manufactured by TA Instruments) having a diameter of 4 cm/2' under measurement conditions of varying the temperature at 2° C./min in a range from 40° C. to −10° C. in Oscillation Step/Temperature Ramp. The measurement is started after previously keeping the sample solution at a measurement initiating temperature until the liquid temperature becomes constant. It is preferred that the viscosity at 40° C. is from 1 to 300 Pa·sec and at the same time, the dynamic storage modulus at −5° C. is from 10,000 to 1,000,000 Pa. More preferably, the viscosity at 40° C. is from 1 to 200 Pa·sec and at the same time, the dynamic storage modulus at −5° C. is from 30,000 to 500,000 Pa.

[Properties of Cellulose Acylate Film]

The cellulose acylate film suitably used as the transparent support of an antireflection film or as a transparent protective film for a polarizing film preferably has the following properties.

[Dynamic Properties of Film]

(Mechanical Properties of Film)

The curl value in the width direction of the transparent protective film is preferably from −7/m to +7/m. When the curl value in the width direction of the transparent protective film is in the range above, this is preferred because at the time of producing a long and broad transparent protective film, the film can be handled without any trouble, breaking of the film does not occur, dusts due to intense contact of the film with the conveying roll at the edge or center part of the film are not generated, attachment of extraneous substances on the film is less allowed, and the frequency of point defects or coating streaks on the polarizing plate of the present invention does not exceed the tolerance. In addition, entering of a bubble can be advantageously prevented at the lamination to a polarizing film.

The curl value can be measured according to the measuring method (ANSI/ASCPH 1.29-1985) prescribed by the American National Standards Institute.

The residual solvent amount of the transparent protective film is preferably from 0.001 to 1.5 mass %, because curling can be suppressed. The residual solvent amount is more preferably from 0.01 to 1.0 mass %. It is considered that when the residual solvent amount at the film formation by the solvent casting film-forming method is made small, the free volume is reduced and this acts as a main factor for the effect of suppressing the curling.

The tear strength of the cellulose acylate film, in terms of tear strength based on the tear strength test (Ermendorf Tear Method) of JIS K7128-2:1998, is preferably 2 g or more from the standpoint that the film strength can be satisfactorily maintained even with the above-described film thickness. The tear strength is more preferably from 5 to 25 g, still more preferably from 6 to 25 g. Also, the tear strength in terms of 60 μm is preferably 8 g or more, more preferably from 8 to 15 g. Specifically, a sample piece of 50 mm×64 mm is subjected to moisture conditioning under the conditions of 25° C. and 65% RH for 2 hours and then, the tear strength can be measured using a light-load tear strength tester.

The scratch strength is preferably 2 g or more, more preferably 5 g or more, still more preferably 10 g or more. Within this range, the scratch resistance of film surface and the handleability are maintained without problem. The transparent protective film surface is scratched with a sapphire needle having a conical apex angle of 90° and a tip radius of 0.25 m, and the scratch strength can be evaluated by the load (g) when the scratch mark is recognizable with an eye.

(Hygroscopic Expansion Coefficient of Film)

The cellulose acylate film preferably has a hygroscopic expansion coefficient of $30 \times 10^{-5}$/% RH or less. The hygroscopic expansion coefficient is more preferably $15 \times 10^{-5}$/% RH or less, still more preferably $10 \times 10^{-5}$/% RH or less. The hygroscopic expansion coefficient is preferably smaller but is usually a value of $1.0 \times 10^{-5}$/% RH or more. The hygroscopic expansion coefficient indicates the variation in the length of a sample when the relative humidity is varied at a given temperature. By this adjustment of the hygroscopic expansion coefficient, the transparent protective film of a polarizing plate can have good durability or in the case of a polarizing plate where an optically compensatory film is stacked, a frame-like increase of transmittance, that is, light leakage due to strain, can be prevented while maintaining the optically compensating function.

The measuring method of the hygroscopic expansion coefficient is described below. A sample of 5 mm in width and 20 mm in length is cut out from the produced cellulose acylate film and in the state of one end being fixed, the sample is suspended in an atmosphere of 25° C. and 20% RH (R0). A weight of 0.5 g is hung at another end and after the sample is left standing for 10 minutes, the length (H0) is measured. Next, while keeping the temperature at 25° C., the humidity is changed to 80% RH (R1) and after the sample is left standing for 24 hours, the length (H1) is measured. The hygroscopic expansion coefficient is calculated according to the following mathematical formula (10). The measurement is performed for 10 units of the same sample, and the average value is employed.

Hygroscopic expansion coefficient(/% $RH$)= {($H1$−$H0$)/$H0$}/($R1$−$R0$)   Mathematical formula (10)

In order to reduce the dimensional change due to moisture absorption of the produced cellulose acylate film, this can be achieved by adding, for example, the above-described plasticizer or light-transmitting particle for use in the present invention. The plasticizer having a bulky and hydrophobic polycyclic alicyclic structure in the molecule is considered to work effectively. A method of decreasing the residual solvent amount in the cellulose acylate film and thereby making small the free volume is also effective. Specifically, the drying is preferably performed under the conditions of causing the residual solvent amount to fall in the range of 0.001 to 1.5 mass %, more preferably from 0.01 to 1.0 mass %, based on the cellulose acylate film.

(Equilibrium Moisture Content of Film)

As for the equilibrium moisture content of the cellulose acylate film, when the cellulose acylate film is used as a transparent protective film of a polarizing plate, irrespective of the film thickness, the equilibrium moisture content at 25° C. and 80% RH is preferably from 0 to 4 mass %, more preferably from 0.1 to 3.5 mass %, still more preferably from 1 to 3 mass %, so as not to impair the adhesive property to a water-soluble polymer such as polyvinyl alcohol. When the equilibrium moisture content is not more than the upper limit above, in using the cellulose acylate film as a transparent protective film of a polarizing plate, dependency of the retardation on the humidity change does not become excessively large and this is preferred.

The moisture content is determined by measuring a sample of 7 mm×35 mm of the cellulose acylate film of the present invention by the Karl Fischer method by using a water content meter "CA-03" and a sample drying device "VA-05" [both manufactured by Mitsubishi Chemical Corporation]. The moisture content is calculated by dividing the amount (g) of water by the mass (g) of the sample.

(Moisture Permeability of Film)

The moisture permeability of the cellulose acylate film of the present invention is determined by measuring the film according to JIS Z-0208 under the conditions of a temperature of 60° C. and a humidity of 95% RH and converting the obtained value into a value in terms of the film thickness of 80 μm. The moisture permeability is preferably from 400 to 2,000 g/m$^2$·24 h, more preferably from 500 to 1,800 g/m$^2$·24 h, still more preferably from 600 to 1,600 g/m$^2$·24 h. When the moisture permeability is not more than the upper limit above, the humidity dependency of the retardation value of the film scarcely exceeds 0.5 nm/% RH in terms of the absolute value and this is preferred. On the other hand, when the moisture permeability is not less than the lower limit above, at the time of laminating the cellulose acylate film to a polarizing film to produce a polarizing plate, a trouble that, for example, drying of the adhesive is hindered by the cellulose acylate film to cause an adhesion failure is advantageously less brought about.

The moisture permeability is small when the thickness of the cellulose acylate film is large, and the moisture permeability is large when the film thickness is small. Therefore, the moisture permeability of a sample having any film thickness needs to be converted in terms of the film thickness by setting the standard at 80 μm. The conversion in terms of film thickness is performed according to (moisture permeability in terms of 80 μm=measured moisture permeability×measured film thickness μm/80 μm).

As for the measuring method of moisture permeability, there can be applied a method described in "Measurement of Amount of Water Vapor Permeated (mass method, thermometer method, water vapor pressure method, adsorption amount method)" of *Kobunshi Jikken Koza 4, Kobunshi no Bussei II* (*Polymer Experiment Lecture 4, Physical Properties II of Polymers*), pp. 285-294, Kyoritsu Shuppan. Specifically, a cellulose acylate film sample of 70 mmφ is humidity-conditioned at 25° C.-90% RH or 60° C.-95% RH for 24 hours, the amount (g/m$^2$) of water per unit area is calculated according to JIS Z-0208 by a moisture permeability tester ["KK-709007" manufactured by Toyo Seiki Seisaku-Sho, Ltd.], and the moisture permeability is determined by: moisture permeability=mass after humidity conditioning−mass before humidity conditioning.

<Optical Film>

The optical film of the present invention is an optical film having a hardcoat layer of 3 to 15 μm in thickness on the transparent support of the present invention. The optical film of the present invention is preferably an optical film where a low refractive index layer having a refractive index lower than the hardcoat layer is present on the hardcoat layer.

<Hardcoat Layer>

In the optical film of the present invention, a hardcoat layer is preferably provided on one surface of the transparent support for imparting physical strength to the film and achieving a surface profile with good jet-black color. In a preferred embodiment (antireflection film), at least a low refractive index layer is provided on the hardcoat layer (in a more preferred embodiment, at least a medium refractive index layer and a high refractive index layer are provided between the hardcoat layer and the low refractive index). The hardcoat layer may be composed of a stack of two or more layers.

In the present invention, in view of optical design for obtaining an antireflection film, the refractive index of the hardcoat layer is preferably from 1.45 to 2.00, more preferably from 1.45 to 1.55, still more preferably from 1.48 to 1.55, yet still more preferably from 1.49 to 1.53. By controlling the refractive index of the hardcoat layer to this range, an antireflection film satisfactorily reduced in the surface reflectance while suppressing the reflected color to a neutral range can be obtained. Furthermore, when the refractive index of the hardcoat layer is controlled to the range above, a failure attributable to the refractive index difference between the cellulose acylate transparent support and the hardcoat layer, called interference unevenness, can be reduced.

From the standpoint of imparting satisfactory durability and impact resistance to the film, the thickness of the hardcoat layer is preferably from 3 to 15 μm, more preferably from 3 to 14 μm, still more preferably from 4 to 12 μm, and most preferably from 5 to 8 μm. By setting the thickness of the hardcoat layer to this range, the film can be prevented from cracking due to bending during working or the like.

The strength of the hardcoat layer is preferably 2H or more, more preferably 3H or more, and most preferably 4H or more, in the pencil hardness test.

Furthermore, in the Taber test according to JIS K5400, the abrasion loss of the specimen between before and after test is preferably smaller.

The hardcoat layer is preferably formed through a crosslinking or polymerization reaction of an ionizing radiation-curable compound. For example, a coating composition containing an ionizing radiation-curable polyfunctional monomer or polyfunctional oligomer is coated on the transparent support, and a crosslinking or polymerization reaction of the polyfunctional monomer or polyfunctional oligomer is brought about, whereby the hardcoat layer can be formed.

The functional group in the ionizing radiation-curable polyfunctional monomer or polyfunctional oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

For the purpose of imparting internal scattering or imparting a surface uneven profile to the hardcoat layer, the hardcoat layer may contain a light-transmitting particle, for example, an inorganic compound particle or a resin particle, having an average particle diameter of 0.01 μm or more and less than 6.0 μm, preferably from 1.0 μm to 4.0 μm. However, since the internal scattering required is imparted, as described above, by a light-transmitting particle contained in the transparent support, a particle of 6 μm or more is preferably not contained in the hardcoat layer. Also, an inorganic fine particle having an average particle diameter of 1.0 μm or less is added with the intention of adjusting the refractive index of the hardcoat layer, but this inorganic fine particle has an adverse effect of decreasing the stability of the coating solution for hardcoat layer and therefore, is preferably not contained.

As for the surface uneven profile of the hardcoat layer, the arithmetic average roughness (Ra) is preferably from 0.03 to 0.30 μm. Ra is more preferably from 0.05 to 0.15 μm. Also, the average distance of irregularities (Sm) is preferably from 10 to 150 μm, more preferably from 50 to 150 μm, still more preferably from 60 to 120 μm. The average distance of irregularities Sm can be measured in accordance with JIS B0601 (1994).

[Low Refractive Index Layer]

In the present invention, a low refractive index layer can be provided above the hardcoat layer, that is, on the remoter side from the transparent support. By having a low refractive index layer, an antireflection function can be imparted to the antiglare film and the antiglare property can be more enhanced. The refractive index of the low refractive index layer is preferably set to be lower than the refractive index of the hardcoat layer. If the refractive index difference between the low refractive index layer and the hardcoat layer is too small, the antireflectivity is liable to decrease, whereas if it is excessively large, the color tint of reflected light tends to be intensified. The refractive index difference between the low refractive index layer and the hardcoat layer is preferably from 0.01 to 0.30, more preferably from 0.05 to 0.20. The low refractive index layer can be formed using a low refractive index material. As for the low refractive index material, a low refractive index binder may be used. A low refractive index layer may also be formed by adding a fine particle to a binder.

The low refractive index binder which can be preferably used is a fluorine-containing copolymer. The fluorine-containing copolymer preferably contains a constitutional unit derived from a fluorine-containing vinyl monomer and a constitutional unit for imparting crosslinking property.

(Fluorine-Containing Copolymer)

Examples of the fluorine-containing vinyl monomer mainly constituting the fluorine-containing copolymer include fluoroolefins (e.g., fluoroethylene, vinylidene fluoride, tetrafluoroethylene, hexafluoropropylene), partially or completely fluorinated alkyl ester derivatives of (meth)acrylic acid {e.g., "VISCOAT 6FM" (trade name) produced by Osaka Organic Chemical Industry Ltd., "R-2020" (trade name) produced by Daikin Industries, Ltd.}, and completely or partially fluorinated vinyl ethers. Among these, perfluoroolefins are preferred, and hexafluoropropylene is more preferred in view of refractive index, solubility, transparency, availability and the like.

When the compositional ratio of the fluorine-containing vinyl monomer is increased, the refractive index can be lowered, but the film strength tends to decrease. In the present invention, the fluorine-containing vinyl monomer is preferably introduced such that the copolymer has a fluorine content of 20 to 60 mass %, more preferably from 25 to 55 mass %, still more preferably from 30 to 50 mass %.

The constitutional unit for imparting crosslinking reactivity mainly includes the following units (A), (B) and (C):

(A): a constitutional unit obtained by the polymerization of a monomer previously having a self-crosslinking functional group within the molecule, such as glycidyl (meth)acrylate and glycidyl vinyl ether, (B): a constitutional unit obtained by the polymerization of a monomer having a carboxyl group, a hydroxyl group, an amino group, a sulfo group or the like {for example, a (meth)acrylic acid, a methylol (meth)acrylate, a hydroxyalkyl (meth)acrylate, an allyl acrylate, a hydroxyethyl vinyl ether, a hydroxybutyl vinyl ether, a maleic acid and a crotonic acid}, and (C): a constitutional unit obtained by reacting a compound having a group capable of reacting with the functional group of (A) or (B) above within the molecule and separately having a crosslinking functional group, with the constitutional unit of (A) or (B) above (for example, a constitutional unit which can be synthesized by such a method as causing an acrylic acid chloride to act on a hydroxyl group).

In the constitutional unit (C), the crosslinking functional group is preferably a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimide group, a phenylazide group, a sulfonylazide group, a carbonylazide group, a diazo group, an o-quinonediazide group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. The constitutional unit may contain only one of these groups or may contain two or more thereof. Among these, a (meth)acryloyl group and a cinnamoyl group are preferred, and a (meth)acryloyl group is more preferred.

The method for preparing the photopolymerizable group-containing copolymer specifically includes, but is not limited to, the following methods:

a. a method of effecting esterification by reacting a (meth)acrylic acid chloride with a crosslinking functional group-containing copolymer having a hydroxyl group, b. a method of effecting urethanization by reacting a (meth)acrylic acid ester having an isocyanate group with a crosslinking functional group-containing copolymer having a hydroxyl group, c. a method of effecting esterification by reacting a (meth)acrylic acid with a crosslinking functional group-containing copolymer having an epoxy group, and d. a method of effecting esterification by reacting a (meth) acrylic acid ester having an epoxy group with a crosslinking functional group-containing copolymer having a carboxyl group.

The amount of the photopolymerizable group introduced can be arbitrarily controlled and from the standpoint of, for example, stabilizing the coating film surface state, reducing the surface state failure when an inorganic particle is present together, or enhancing the film strength, a carboxyl group, a hydroxyl group or the like may be caused to remain.

The amount of the constitutional unit for imparting crosslinking property introduced into the copolymer is preferably from 10 to 50 mol %, more preferably from 15 to 45 mol %, still more preferably from 20 to 40 mol %.

In the copolymer useful for the low refractive index layer of the present invention, in addition to the repeating unit derived from the fluorine-containing vinyl monomer and the constitutional unit for imparting crosslinking property, other vinyl monomers may be appropriately copolymerized from various viewpoints such as adherence to substrate, Tg (contributing to film hardness) of polymer, solubility in solvent, transparency, slipperiness, dust protection and antifouling property. A plurality of these vinyl monomers may be used in combination according to the purpose, and these monomers are preferably introduced in a total amount of 0 to 65 mol %, more preferably from 0 to 40 mol %, still more preferably from 0 to 30 mol %, based on the copolymer.

The vinyl monomer unit which can be used in combination is not particularly limited, and examples thereof include olefins (e.g., ethylene, propylene, isoprene, vinyl chloride, vinylidene chloride), acrylic acid esters (e.g., methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethacrylamide), and acrylonitrile.

The fluorine-containing copolymer particularly useful in the present invention is a random copolymer of a perfluoroolefin and vinyl ethers or vinyl esters. Above all, the fluorine-containing copolymer preferably has a group capable of undergoing a crosslinking reaction by itself {for example, a radical reactive group such as (meth)acryloyl group, or a ring-opening polymerizable group such as epoxy group and oxetanyl group}. The crosslinking reactive group-containing polymerization unit preferably occupies from 5 to 70 mol %, more preferably from 30 to 60 mol %, in all polymerization units of the polymer. Preferred examples of the polymer include those described in JP-A-2002-243907, JP-A-2002-372601, JP-A-2003-26732, JP-A-2003-222702, JP-A-2003-294911, JP-A-2003-329804, JP-A-2004-4444 and JP-A-2004-45462.

Also, in the fluorine-containing copolymer useful in the present invention, a polysiloxane structure is preferably introduced for the purpose of imparting antifouling property. The method for introducing a polysiloxane structure is not limited but is preferably, for example, a method of introducing a polysiloxane block copolymerization component by using a silicone macroazo initiator described in JP-A-6-93100, JP-A-11-189621, JP-A-11-228631 and JP-A-2000-313709, or a method of introducing a polysiloxane graft copolymerization component by using a silicone macromer described in JP-A-2-251555 and JP-A-2-308806. Particularly preferred compounds include polymers in Examples 1, 2 and 3 of JP-A-11-189621, and Copolymers A-2 and A-3 of JP-A-2-251555. The content of the polysiloxane component is preferably from 0.5 to 10 mass %, more preferably from 1 to 5 mass %, based on the polymer.

The molecular weight of the copolymer which can be preferably used in the present invention is, in terms of the mass average molecular weight, preferably 5,000 or more, more preferably from 10,000 to 500,000, and most preferably from 15,000 to 200,000. By using polymers differing in the average molecular weight in combination, the surface state of coating film or the scratch resistance may be improved.

In combination with the copolymer above, as descried in JP-A-10-25388 and JP-A-2000-17028, a curing agent having a polymerizable unsaturated group may be appropriately used. A combination use with a compound having a fluorine-containing polyfunctional polymerizable unsaturated group described in JP-A-2002-145952 is also preferred. Examples of the compound having a polyfunctional polymerizable unsaturated group include the polyfunctional monomers described above for the antiglare layer. These compounds are preferred because the effect by the combination use on the improvement of scratch resistance is great particularly when a compound having a polymerizable unsaturated group is used in the copolymer body.

The refractive index of the low refractive index layer is preferably from 1.20 to 1.46, more preferably from 1.25 to 1.42, still more preferably from 1.30 to 1.38. The thickness of the low refractive index layer is preferably from 50 to 150 nm, more preferably from 70 to 120 nm.

(Fine Particle)

The fine particle which can be preferably used in the low refractive index layer of the present invention is described below.

The coated amount of the fine particle contained in the low refractive index layer is preferably from 1 to 100 mg/m$^2$, more preferably from 5 to 80 mg/m$^2$, still more preferably from 10 to 70 mg/m$^2$. When the coated amount of the fine particle is not less than this lower limit, the effect of improving scratch resistance clearly appears, and when it is not more than the upper limit above, a trouble such as worsening of outer appearance or integrated reflectance due to creation of fine irregularities on the low refractive index layer surface does not arise and this is preferred. The fine particle is contained in the low refractive index layer and therefore, preferably has a low refractive index.

Specifically, the fine particle contained in the low refractive index layer is preferably an inorganic fine, a hollow inorganic fine particle or a hollow organic resin fine particle, each having a low refractive index, more preferably a hollow inorganic fine particle. Examples of the inorganic fine particle include a silica fine particle and a hollow silica fine particle.

The average particle diameter of this fine particle is preferably from 30 to 100%, more preferably from 30 to 80%, still more preferably from 35 to 70%, of the thickness of the low refractive index layer. In other words, when the thickness of the low refractive index layer is 00 nm, the particle diameter of the fine particle is preferably from 30 to 100 nm, more preferably from 30 to 80 nm, still more preferably from 35 to 70 nm.

When the particle diameter of this fine particle is not less than the lower limit above, the effect of improving scratch resistance clearly appears, and when it is not more than the above-described upper limit, a trouble such as worsening of outer appearance or integrated reflectance due to creation of fine irregularities on the low refractive index layer surface does not arise and this is preferred.

The fine particle may be either crystalline or amorphous and may be a monodisperse particle or an aggregate particle (in this case, the secondary particle diameter is preferably from 15 to 150% of the thickness of the low refractive index layer). Also, a plurality of kinds (two or more kinds) of particles (differing in the kind or particle diameter) may be used. The particle shape is most preferably spherical but even if indefinite, there arises no problem.

In order to reduce the refractive index of the low refractive index layer, it is particularly preferred to use a hollow silica fine particle. The refractive index of the hollow silica fine particle is preferably from 1.17 to 1.40, more preferably from 1.17 to 1.35, still more preferably from 1.17 to 1.30. The refractive index as used herein indicates the refractive index of the particle as a whole and does not mean the refractive index of only silica as an outer shell forming the hollow silica particle. At this time, assuming that the radius of the cavity inside the particle is $r_i$ and the radius of the outer shell of the particle is $r_o$, the void percentage x is calculated according to the following mathematical formula (3):

$$x=(4\pi r_i^3/3)/(4\pi r_o^3/3)\times 100 \qquad \text{Mathematical Formula (3)}$$

The void percentage x is preferably from 10 to 60%, more preferably from 20 to 60%, and most preferably from 30 to 60%. If the hollow silica particle is intended to have a lower refractive index and a higher void percentage, the thickness of the outer shell becomes small and the strength as a particle decreases. Therefore, in view of scratch resistance, a particle having a refractive index of less than 1.17 is difficult to use. Here, the refractive index of the hollow silica particle is measured by an Abbe refractometer {manufactured by Atago Co., Ltd.}.

From the standpoint of enhancing the antifouling property, it is further preferred to reduce the surface free energy on the low refractive index layer surface. Specifically, a fluorine-containing compound or a compound having a polysiloxane structure is preferably used in the low refractive index layer.

As for the additive having a polysiloxane structure, a reactive group-containing polysiloxane {for example, "KF-100T", "X-22-169AS", "KF-102", "X-22-3701IE", "X-22-164B", "X-22-5002", "X-22-173B", "X-22-174D", "X-22-167B", "X-22-161AS" (trade names), all produced by Shin-Etsu Chemical Co., Ltd.; "AK-5", "AK-30" and "AK-32" (trade names), all produced by Toagosei Co., Ltd.; and "SILAPLANE FM0725" and "SILAPLANE FM0721" (trade names), both produced by Chisso Corporation} is also preferably added. Furthermore, silicone-based compounds shown in Tables 2 and 3 of JP-A-2003-112383 may also be preferably used. Such a polysiloxane is preferably added in an amount of 0.1 to 10 mass %, more preferably from 1 to 5 mass %, based on entire solid content of the low refractive index layer.

[Production Method of Optical Film]

The optical film of the present invention may be formed by the following method, but the present invention is not limited thereto.

[Preparation of Coating Solution]

First, a coating solution containing components for forming each layer is prepared. At this time, an increase in the percentage of water content in the coating solution can be prevented by minimizing the volatilization volume of the solvent. The percentage of water content in the coating solution is preferably 5% or less, more preferably 2% or less. The volatilization volume of the solvent can be suppressed, for example, by enhancing the closeness at the stirring of materials charged into a tank or minimizing the contact area of the coating solution with air during the liquid transfer operation. Also, a device for reducing the percentage of water content in the coating solution may be provided during, before or after the coating.

[Filtration]

The coating solution for use in coating is preferably filtered before it is coated. The filtration is preferably preformed using a filter having a pore size as small as possible within the range allowing for no elimination of the components in the coating solution. In the filtration, a filter having an absolute filtration accuracy of 0.1 to 50 μm is preferably used. A filter having an absolute filtration accuracy of 0.1 to 40 μm is more preferred. The filter thickness is preferably from 0.1 to 10 mm, more preferably from 0.2 to 2 mm. In this case, the filtration is preferably performed under a filtration pressure of 1.5 MPa or less, more preferably 1.0 MPa or less, still more preferably 0.2 MPa or less.

The filter member of filtration is not particularly limited as long as it does not affect the coating solution. Specific examples thereof are the same as those of the filtration member described above for the wet dispersion of an inorganic compound. It is also preferred to ultrasonically disperse the filtered coating solution immediately before coating and assist in defoaming or keeping the dispersed state of the dispersion.

[Treatment Before Coating]

Before coating, the transparent support is preferably subjected to a heat treatment for correcting the base deformation or to a surface treatment for improving the coatability or adhesion to the coated layer. The method for the surface treatment specifically includes a corona discharge treatment, a glow discharge treatment, a flame treatment, an acid treatment, an alkali treatment and an ultraviolet irradiation treatment. It is also preferred to provide an undercoat layer as described in JP-A-7-333433.

Furthermore, a dedusting step is preferably performed as a pre-step before coating. The dedusting method for use in this step includes a dry dedusting method, for example, a method of pressing a nonwoven fabric, a blade or the like against the film surface described in JP-A-59-150571; a method of blowing air having a high cleanliness at a high speed to separate off attached matters from the film surface and sucking these matters via a proximate suction port described in JP-A-10-309553; and a method of blowing compressed air under ultrasonic vibration to separate off attached matters and sucking these matters described in JP-A-7-333613 {for example, NEW ULTRA-CLEANER manufactured by Shinko Co., Ltd.}. Also, a wet dedusting method may be used, such as a method of introducing the film into a cleaning bath and separating off attached matters by using an ultrasonic vibrator; a method of supplying a cleaning solution to the film and blowing air at a high speed, followed by sucking described in JP-B-49-13020; and a method of continuously rubbing the web with a liquid-moistened roll and then cleaning the web by jetting a liquid onto the rubbed face described in JP-A-2001-38306. Among these dedusting methods, an ultrasonic dedusting method and a wet dedusting method are preferred in view of the dedusting effect.

Before performing such a dedusting step, static electricity on the transparent support is preferably destaticized for elevating the dedusting efficiency and suppressing attachment of dirt. As for the destaticizing method, an ionizer of corona discharge type, an ionizer of light irradiation type (e.g., UV, soft X-ray), and the like may be used. The voltage charged on the transparent support before and after dedusting and coating is preferably 1,000 V or less, more preferably 300 V or less, still more preferably 100 V or less.

From the standpoint of maintaining the planarity of the film, the transparent support such as cellulose acylate film in these treatments is preferably kept at a temperature not more than Tg of the polymer constituting the film, in the case of a cellulose acylate film, at 150° C. or less.

As in the case of using the optical film of the present invention for a protective film of a polarizing plate, when a cellulose acylate film which is a preferred transparent support of the optical film is adhered to a polarizing film, an acid or alkali treatment, that is, a saponification treatment for cellulose acylate, is preferably performed in consideration of adhesion to the polarizing film.

In view of adhesion, the surface energy of the cellulose acylate film as the transparent support is preferably 55 mN/m or more, more preferably from 60 to 75 mN/m. The surface energy can be adjusted by the above-described surface treatment.

[Coating]

Each layer of the film of the present invention can be formed by the following coating methods, but the present invention is not limited to these methods. There are used known methods such as dip coating method, air knife coating method, curtain coating method, roller coating method, wire bar coating method, gravure coating method, extrusion coating method (die coating method) (see, U.S. Pat. No. 2,681,294 and International Publication No. 2005/123274, pamphlet), and microgravure coating method. Among these, a microgravure coating method and a die coating method are preferred.

The microgravure coating method for use in the present invention is a coating method where a gravure roll having a diameter of about 10 to 100 mm, preferably from about 20 to 50 mm, and having a gravure pattern engraved on the entire circumference is disposed below the transparent support and simultaneously with the rotation of the gravure roll in the direction reverse to the support-conveying direction, the surplus coating solution is scraped off from the surface of the gravure roll by a doctor blade, thereby allowing a constant amount of the coating solution to be transferred to and coated on the bottom surface of the support at the position where the top surface of the support is in a free state. A roll-form transparent support is continuously unrolled and on one side of the unrolled support, at least one layer out of at least the antiglare layer and the low refractive index layer containing a fluorine-containing olefin-based polymer can be coated by the microgravure coating method.

As for the coating conditions in the microgravure coating method, the number of lines in the gravure pattern engraved on the gravure roll is preferably from 50 to 800 lines/inch, more preferably from 100 to 300 lines/inch, the depth of the gravure pattern is preferably from 1 to 600 μm, more preferably from 5 to 200 μm, the rotation number of the gravure roll is preferably from 3 to 800 rpm, more preferably from 5 to 200 rpm, and the transparent support-conveying speed is preferably from 0.5 to 100 m/min, more preferably from 1 to 50 m/min.

In order to provide the film of the present invention with high productivity, an extrusion method (die coating method) is preferably used. In particular, coating can be preferably performed by the extrusion method described in JP-A-2006-122889.

The die coating method is a pre-weighing system and therefore, a stable film thickness can be easily ensured. Also, in this coating method, a coating solution in a low coated amount can be coated at a high speed with good film thickness stability. Such a coating solution may be coated by other coating methods, but the dip coating method inevitably involves vibration of the coating solution in a liquid-receiving tank, which readily leads to generation of stepwise unevenness. In a reverse roll coating method, stepwise unevenness is liable to occur due to eccentricity or deflection of the roll involved in the coating. Also, these coating methods are a post-weighing system and therefore, a stable film thickness can be hardly ensured. In view of productivity, the coating is preferably performed at a rate of 20 m/min or more by using the die coating method.

[Drying]

After coating on the transparent support directly or through other layers, the film of the present invention is preferably conveyed in the form of a web to a heated zone for drying the solvent.

As for the method of drying the solvent, various known techniques may be utilized. Specific examples thereof include the techniques described in JP-A-2001-286817, JP-A-2001-314798, JP-A-2003-126768, JP-A-2003-315505 and JP-A-2004-34002.

The temperature in the drying zone is preferably from 25 to 140° C., and it is preferred that the temperature in the first half of the drying zone is relatively low and the temperature in the second half is relatively high. However, the temperature is preferably not more than the temperature at which the components other than the solvent, contained in the composition of the coating solution for each layer start volatilizing. For example, some of commercially available photoradical generators used in combination with an ultraviolet curable resin are volatilized by about several tens of percent within several minutes in warm air at 120° C., and some of monofunctional or bifunctional (meth)acrylic acid ester monomers or the like allow their volatilization to proceed in warm air at 100° C. In such a case, as described above, the drying zone temperature is preferably not more than the temperature at which the components other the solvent, contained in the coating composition for each layer start volatilizing.

In order to prevent drying unevenness, the drying air after applying the coating solution for each layer on the transparent support is preferably blown at an air velocity of 0.01 to 2 m/sec on the coating film surface during the time where the solid content concentration of the coating solution is from 1 to 50%. Also, in the drying zone after applying the coating solution for each layer on the transparent support, the temperature difference between the support and the conveying roll in contact with the surface opposite the coating surface of the support is preferably set to be from 0 to 20° C., because drying unevenness due to uneven heat transfer on the conveying roll can be prevented.

[Curing]

The optical film of the present invention after drying the solvent is passed in the form of a web through a zone for curing each coating film by the irradiation of ionizing radiation and/or under heat, whereby the coating film can be cured. The species of the ionizing radiation for use in the present invention is not particularly limited and according to the kind of the curable composition for forming the film, the radiation may be appropriately selected from ultraviolet ray, electron beam, near ultraviolet ray, visible light, near infrared ray, infrared ray, X-ray and the like, but ultraviolet ray and electron beam are preferred, and ultraviolet ray is more preferred in that the handling is easy and a high energy can be easily obtained.

As regards the light source of ultraviolet ray that photopolymerizes the ultraviolet-curable compound, any light source may be used as long as it emits an ultraviolet ray. Examples of the light source which can be used include a low-pressure mercury lamp, a medium-pressure mercury lamp, a high-pressure mercury lamp, an ultrahigh-pressure mercury lamp, a carbon arc lamp, a metal halide lamp and a xenon lamp. Also, an ArF excimer laser, a KrF excimer laser, an excimer lamp, a synchrotron radiation light and the like may be used. Among these, an ultrahigh-pressure mercury lamp, a high-pressure mercury lamp, a low-pressure mercury lamp, a carbon arc, a xenon arc and a metal halide lamp can be preferably used.

An electron beam may also be similarly used. Examples of the electron beam include electron beams having an energy of 50 to 1,000 keV, preferably from 100 to 300 keV, emitted from various electron beam accelerators such as Cockroft-Walton type, Van de Graff type, resonance transformer type, insulating core transformer type, linear type, dynamitron type and high frequency type.

The irradiation conditions vary depending on individual lamps, but the quantity of light irradiated is preferably 10 mJ/cm$^2$ or more, more preferably from 50 to 10,000 mJ/cm$^2$, still more preferably from 50 to 2,000 mJ/cm$^2$. At this time, the irradiation dose distribution in the web width direction is preferably, including both edges, from 50 to 100%, more preferably from 80 to 100%, based on the maximum irradiation dose in the center.

In the present invention, at least one layer out of layers stacked on the transparent support is preferably cured by a process of irradiating ionizing radiation and at the same time, irradiating the ionizing radiation in an atmosphere having an oxygen concentration of 1,000 ppm or less, preferably 500 ppm or less, more preferably 100 ppm or less, most preferably 50 ppm or less, for 0.5 seconds or more from the initiation of ionizing radiation irradiation in a state of the layer being heated to a film surface temperature of 50° C. or more.

It is also preferred that the layer is heated in an atmosphere having a low oxygen concentration simultaneously with and/or successively to the irradiation of ionizing radiation. In particular, the low refractive index layer which is an outermost layer and has a small thickness is preferably cured by this method. The curing reaction is accelerated by the heat and a film excellent in the physical strength and chemical resistance can be formed.

The time for which the ionizing radiation is irradiated is preferably from 0.5 to 60 seconds, more preferably from 0.7 to 10 seconds. When the irradiation time is 0.5 seconds or more, the curing reaction can be completed and sufficient curing can be performed. Also, maintaining the low oxygen condition for a long time requires large-scale equipment and a large amount of inert gas such as nitrogen and therefore, the irradiation time is preferably 60 seconds or less.

As for the method to reduce the oxygen concentration to 1,000 ppm or less, replacement of the atmospheric air with another gas is preferred, and replacement with nitrogen (nitrogen purging) is more preferred.

By setting the conditions such that an inert gas is supplied to the ionizing radiation irradiation chamber (sometimes referred to as a "reaction chamber") of performing a curing reaction by ionizing radiation and at the same time, is slightly blown out to the web inlet side of the reaction chamber, not only the carry-over air associated with the web conveyance can be eliminated to effectively decrease the oxygen concentration in the reaction chamber but also the substantial oxygen concentration on the electrode surface greatly susceptible to curing inhibition by oxygen can be efficiently reduced. The direction to which the inert gas flows on the web inlet side of the reaction chamber can be controlled by adjusting the balance between air supply and air discharge in the reaction chamber. Blowing of an inert gas directly on the web surface is also preferred as the method for removing the carry-over air.

Furthermore, when a pre-chamber is provided before the reaction chamber and oxygen on the web surface is previously eliminated, the curing can be allowed to proceed more efficiently. In order to efficiently use the inert gas, the gap between the side surface constituting the web inlet side of the ionizing radiation reaction chamber or pre-chamber and the web surface is preferably from 0.2 to 15 mm, more preferably from 0.2 to 10 mm, and most preferably from 0.2 to 5 mm. However, for continuously producing the web, the web needs to be joined and spliced, and a method of laminating the webs by means of a bonding tape or the like is widely employed for joining. Therefore, when the gap between the inlet surface of the ionizing radiation reaction chamber or pre-chamber and the web is too small, there arises a problem that the bonding member such as bonding tape is hung up. To solve this problem, in the case of forming a narrow gap, at least a part of the inlet surface of the ionizing radiation reaction chamber or pr-chamber is preferably made movable, so that the gap can be widened for the thickness of the bonded part when the bonded part enters the chamber. This construction may be realized by a method where the inlet surface of the ionizing radiation reaction chamber or pre-chamber is made movable back and forth in the running direction and moved back and forth to widen the gap when the bonded part passes therethrough, or a method where the inlet surface of the ionizing radiation reaction chamber or pre-chamber is made movable perpendicularly to the web surface and moved vertically to widen the gap when the bonded part passes therethrough.

The ultraviolet ray may be irradiated every time when a plurality of layers constituting the optical film of the present invention each is formed, or may be irradiated after the layers are stacked. Alternatively, some of these layers may be irradiated in combination. In view of productivity, the ultraviolet ray is preferably irradiated after stacking multiple layers.

In the present invention, at least one layer stacked on the transparent support may be cured by irradiating ionizing radiation a plurality of times. In this case, the irradiation of ionizing radiation is preferably performed at least two times in continuous reaction chambers where the oxygen concentration does not exceed 1,000 ppm. By performing the irradiation of ionizing radiation a plurality of times in reaction chambers having the same low oxygen concentration, the reaction time necessary for curing can be effectively ensured. Particularly, in the case of increasing the production speed for high productivity, the ionizing radiation needs to be irradiated a plurality of time so as to ensure an ionizing radiation energy necessary for the curing reaction.

The curing percentage (100–percentage of residual functional group content) is preferably a certain value less than 100%, because when another layer is provided thereon and cured by ionizing radiation and/or heat, the curing percentage of the lower layer becomes higher than that before providing the upper layer and the adherence between the lower layer and the upper layer is improved.

[Hangling]

In order to continuously produce the optical film of the present invention, a step of continuously delivering a roll-like transparent support film, a step of coating and drying the coating solution, a step of curing the coating film, and a step of taking up the support film having thereon the cured layer are performed.

The support is continuously delivered from a roll-like transparent support to a clean room, static electricity charged to the support is removed by a destaticizing apparatus in the clean room, and extraneous substances adhering to the transparent support are then removed by a dedusting apparatus. Subsequently, a coating solution is coated on the support in a coating part disposed in the clean room, and the coated transparent support is conveyed to a drying room and dried.

The transparent support having thereon the dried coating layer is delivered from the drying room to a curing room, where the monomer contained in the coating layer is polymerized to effect curing. The transparent support having thereon the cured layer is further conveyed to a curing part, where the curing is completed, and the transparent support having thereon the completely cured layer is taken up into a roll.

The above-described steps may be performed every time when each layer is formed, or a plurality of coating part-drying room-curing part lines may be provided to continuously perform the formation of respective layers.

In producing the optical film of the present invention, it is preferred that in combination with the above-described microfiltration operation of the coating solution, the coating step in the coating part and the drying step in the drying room are performed in an atmosphere having high air cleanliness and dirt or dusts on the transparent support film are satisfactorily removed before performing the coating. The air cleanliness in the coating step and drying step is, according to the standard of air cleanliness in US Federal Standard 209E, preferably not lower than class 10 (the number of particles of 0.5 μm or more is 353 particles/m$^3$ or less), more preferably not lower than class 1 (the number of particles of 0.5 μm or more is 35.5 particles/m$^3$ or less). The air cleanliness is preferably high also in the parts other than the coating-drying steps, such as delivery part and take-up part.

[Saponification Treatment]

In producing a polarizing plate by using the optical film of the present invention for one protective film out of two surface protective films of the polarizing film, the surface on the side to be laminated with the polarizing film is preferably hydrophilized to improve the adhesion on the bonding surface.

a. Method by Dipping in Alkali Solution

This is a technique of dipping the film in an alkali solution under appropriate conditions to saponify all the surface having reactivity with an alkali on the entire film surface. This method requires no special equipment and is preferred in view of cost. The alkali solution is preferably an aqueous sodium hydroxide solution. The concentration is preferably from 0.5 to 3 mol/L, more preferably from 1 to 2 mol/L. The liquid temperature of the alkali solution is preferably from 30 to 75° C., more preferably from 40 to 60° C.

The combination of the saponification conditions is preferably a combination of relatively mild conditions but may be selected according to the materials or construction of the film or the objective contact angle. The film after dipping in an alkali solution is preferably well washed with water or dipped in a dilute acid to neutralize the alkali component so as not to allow an alkali component to remain in the film.

By applying a saponification treatment, the surface opposite the surface having the coating layer is hydrophilized. The protective film for polarizing plate is used by adhering the hydrophilized surface of the transparent support to the polarizing film.

The hydrophilized surface is effective in improving the adhesion to the adhesive layer including polyvinyl alcohol as the main component.

As for the saponification treatment, the contact angle for water on the transparent support surface opposite the surface having the coating layer is preferably lower in view of adhesion to the polarizing film, but, on the other hand, in the dipping method, the surface having the coating layer as well as the inside of the layer are damaged simultaneously by an alkali and therefore, it is important to select minimum necessary reaction conditions. When the contact angle for water on the transparent support surface on the opposite side is used as the index for damage of each layer by an alkali, particularly in the case where the transparent support is triacetyl cellulose, the contact angle is preferably from 10 to 50°, more preferably from 30 to 500, still more preferably from 40 to 50°. A contact angle of 50° or less is preferred because no problem arises in the adhesion to the polarizing film, and a contact angle of 10° or more is preferred because the film is not so much damaged and the physical strength is not impaired.

b. Method by Coating of Alkali Solution

In order to avoid the damage of each layer in the dipping method, an alkali solution coating method where an alkali solution is coated only on the surface opposite the surface having the coating layer under appropriate conditions and then subjected to heating, water washing and drying is preferably used. In this case, the "coating" means to contact an alkali solution or the like only with the surface to be saponified and includes spraying and contact with a belt or the like impregnated with the solution, other than coating.

When such a method is employed, equipment and step for coating an alkali solution are separately required and therefore, the cost is higher than the dipping method of (a). However, since the alkali solution comes into contact only with the surface to be saponified, a layer using a material weak to an alkali solution can be provided on the opposite surface. For example, a vapor-deposition film or a sol-gel film is subject to various effects such as corrosion, dissolution and separation by an alkali solution and is preferably not provided in the case of dipping method, but in this coating method, such a film is not contacted with the solution and therefore, can be used without problem.

The saponification methods (a) and (b) both can be performed after unrolling a roll-like support and forming respective layers and therefore, the saponification step may be added after the film production step to perform the treatment in a series of operations. Furthermore, by continuously performing also a step of laminating a polarizing plate to a support unrolled similarly, the polarizing plate can be produced with higher efficiency than in the case of performing the same operations in the sheet-fed manner.

c. Method of Performing Saponification with Protection by Laminate Film

Similarly to (b) above, when the coating layer is insufficient in the resistance against an alkali solution, a method of, after a final layer is formed, laminating a laminate film on the surface where the final layer is formed, then dipping the stack in an alkali solution to hydrophilize only the triacetyl cellulose surface opposite the surface where the final layer is formed, and thereafter peeling off the laminate film, may be employed. Also in this method, a hydrophilizing treatment to an extent necessary as a polarizing plate protective film can be applied without damaging the coating layer only to the surface of the triacetyl cellulose film as the transparent support, opposite the surface where the final layer is formed. As compared with the method (b), this method is advantageous in that a special apparatus for coating an alkali solution is not necessary, though the laminate film becomes a waste.

d. Method by Dipping in Alkali Solution after Formation Up to Mid-Layer

In the case where the layers up to a lower layer have resistance against an alkali solution but a layer thereon is insufficient in the resistance against an alkali solution, a method of forming the layers up to the lower layer, then dipping the stack in an alkali solution to hydrophilize both surfaces, and thereafter forming the upper layer thereon, may be employed. The production process becomes cumbersome but this method is advantageous in that, for example, in a film including an antiglare layer and a low refractive index layer formed of a fluorine-containing sol-gel film, when the layers have a hydrophilic group, the interlayer adhesion between the antiglare layer and the low refractive index layer is enhanced.

e. Method of Forming Coating Layer on Previously Saponified Triacetyl Cellulose Film After previously saponifying a triacetyl cellulose film as the transparent support, for example, by dipping it in an alkali solution, a coating layer may be formed on either one surface directly or through other layers. In the case of performing the saponification by dipping the film in an alkali solution, the interlayer adhesion between the coating layer and the triacetyl cellulose surface hydrophilized by the saponification is sometimes worsened. In such a case, the problem can be overcome by applying, after the saponification, a treatment such as corona discharge or glow discharge only to the surface where the coating layer is to be formed, thereby removing the hydrophilized surface, and then forming the coating layer. Also, when the coating layer has a hydrophilic group, good interlayer adhesion may be obtained.

<Polarizing Plate>
[Production of Polarizing Plate]
[Construction of Polarizing Plate]

The transparent support of the present invention may be used for either one or both of the protective films of a polarizing plate including a polarizing film and protective films disposed on both sides thereof.

The transparent support of the present invention may be used for one protective film, while using a normal cellulose acetate film for the other protective film, but a cellulose acetate film produced by a solution film-forming method and stretched in the width direction of a rolled film form at a stretch ratio of 10 to 100% is preferably used for the other protective film.

Furthermore, in the polarizing plate of the present invention, it is also a preferred embodiment that one surface is the transparent support of the present invention and the other protective film is an optically compensatory film having an optically anisotropic layer composed of a liquid crystalline compound.

[Polarizing Film]

The polarizing film includes an iodine-based polarizing film, a dye-based polarizing film using a dichroic dye, and a polyene-based polarizing film. The iodine-based polarizing film and the dye-based polarizing film are generally produced using a polyvinyl alcohol-based film.

The polarizing film may be a known polarizing film or a polarizing film cut out from a lengthy polarizing film with the absorption axis of the polarizing film being neither parallel nor perpendicular to the longitudinal direction. The lengthy polarizing film with the absorption axis of the polarizing film being neither parallel nor perpendicular to the longitudinal direction is produced by the following method.

That is, the polarizing film can be produced by a stretching method where a continuously fed polymer film such as polyvinyl alcohol-based film is stretched at 1.1 to 20.0 times at least in the film width direction by applying a tension while holding both edges of the film with holding means and under the condition that the difference in the travelling speed in the longitudinal direction between the holding devices at both edges of the film is within 3%, the film travelling direction is bent in a state of the film being held at both edges to create a tilt angle of 20 to 70° between the film travelling direction at the outlet in the step of holding both edges of the film and the substantial stretching direction of the film. Particularly, a polarizing film produced with a tilt angle of 45° is preferred in view of productivity.

The stretching method of a polymer film is described in detail in JP-A-2002-86554 (paragraphs [0020] to [0030]).

In the present invention, the slow axis of the transparent support or cellulose acetate film of the antireflection film and the transmission axis of the polarizing film are preferably arranged to run substantially in parallel.

[Protective Film]

The moisture permeability of the protective film is important for the productivity of the polarizing plate. The polarizing film and the protective film are laminated with an aqueous adhesive, and the solvent of this adhesive diffuses in the protective film and is thereby dried. As the moisture permeability of the protective film is higher, the drying rate and in turn the productivity are more increased, but if the moisture permeability is excessively high, moisture enters into the polarizing film depending on the environment (at high humidity) where the liquid crystal display device is used, and the polarizing ability decreases.

The moisture permeability of the protective film is determined, for example, by the thickness, free volume or hydrophilicity/hydrophobicity of the transparent support or polymer film (and a polymerizable liquid crystal compound). In the case of using the transparent support of the present invention as a polarizing plate protective film, the moisture permeability is preferably from 100 to 1,000 $g/m^2 \cdot 24$ hrs, more preferably from 300 to 700 $g/m^2 \cdot 24$ hrs.

In the case of film production, the thickness of the transparent support can be adjusted by the lip flow rate and the line speed or by stretching and compression. The moisture permeability varies depending on the main raw material used and therefore, can be adjusted to a preferred range by controlling the thickness.

In the case of film production, the free volume of the transparent support can be adjusted by the drying temperature and time. Also in this case, the moisture permeability varies depending on the main raw material used and therefore, can be adjusted to a preferred range by controlling the free volume.

The hydrophilicity/hydrophobicity of the transparent support can be adjusted by an additive. The moisture permeability is elevated by adding a hydrophilic additive to the above-described free volume, and conversely, the moisture permeability can be lowered by adding a hydrophobic additive.

A polarizing plate having an optically compensating ability can be produced with high productivity at a low cost by independently controlling the moisture permeability.

(Optically Compensatory Film)

It is also a preferred embodiment that out of two protective films of the polarizing film, the film other than the transparent support (including the optical film) of the present invention is an optically compensatory film having an optically compensatory layer including an optically anisotropic layer. The optically compensatory film (retardation film) can improve the viewing angle properties on a liquid crystal display screen.

The optically compensatory film may be a known optically compensatory film, but from the standpoint of widening the viewing angle, the optically compensatory film described in JP-A-2001-100042 is preferred.

<Use Mode of the Present Invention>

[Image Display Device]

The transparent support or optical film of the present invention is suitably used for an image display device such as liquid crystal display (LCD), plasma display panel (PDP), electroluminescent display (ELD) and cathode ray tube display (CRT). The antireflection film of the present invention can be used on a known display such as plasma display panel (PDP) or cathode ray tube display (CRT).

[Liquid Crystal Display Device]

The transparent support, optical film or polarizing plate of the present invention can be advantageously used for an image display device such as liquid crystal display device and is preferably used as the outermost surface layer of the display.

In general, the liquid crystal display device has a liquid crystal cell and two polarizing plates disposed on both sides thereof, and the liquid crystal cell carries a liquid crystal between two electrode substrates. In some cases, one optically anisotropic layer is disposed between the liquid crystal cell and one polarizing plate, or two optically anisotropic layers are disposed, that is, one between the liquid crystal cell and one polarizing plate, and another between the liquid crystal cell and another polarizing plate.

The liquid crystal cell is preferably in TN mode, VA mode, OCB mode, IPS mode or ECB mode.

(TN Mode)

In the TN-mode liquid crystal cell, rod-like liquid crystalline molecules are oriented substantially in the horizontal alignment at the time of not applying a voltage and furthermore, twisted at an angle of 60 to 120°.

The TN-mode liquid crystal cell is most frequently utilized as a color TFT liquid crystal display device and is described in many publications.

(VA Mode)

In the VA-mode liquid crystal cell, rod-like liquid crystalline molecules are oriented substantially in the vertical alignment at the time of not applying a voltage.

The VA-mode liquid crystal cell includes:

(1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625);

(2) an (MVA-mode) liquid crystal cell where the VA mode is modified to a multi-domain system for widening the viewing angle (described in *SID97, Digest of Tech. Papers* (preprints), 28, 845 (1997));

(3) an (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Nippon Ekisho Toronkai (Liquid Crystal Forum of Japan), 58-59 (1998)); and (4) a SURVAIVAL-mode liquid crystal cell (reported in LCD International 98).

(OCB Mode)

The OCB-mode liquid crystal cell is a liquid crystal cell of bend alignment mode where rod-like liquid crystalline molecules are oriented substantially in the reverse direction (symmetrically) between upper portion and lower portion of the liquid crystal cell, and this is disclosed in U.S. Pat. Nos. 4,583,825 and 5,410,422. Since rod-like liquid crystalline molecules are symmetrically oriented between upper portion and lower portion of the liquid crystal cell, the liquid crystal cell of bend alignment mode has an optically self-compensating function. Accordingly, this liquid crystal mode is called an OCB (optically compensatory bend) liquid crystal mode. The liquid crystal display device of bend alignment mode is advantageous in that the response speed is fast.

(IPS Mode)

The IPS-mode liquid crystal cell is a system of effecting the switching by applying a transverse electric field to the nematic liquid crystal, and this is described in detail in *Proc. IDRC (Asia Display '95)*, pp. 577-580 and ibid., pp. 707-710.

(ECB Mode)

In the ECB-mode liquid crystal cell, rod-like liquid crystalline molecules are oriented substantially in the horizontal alignment at the time of not applying a voltage. The ECB mode is one of liquid crystal display modes having a simplest structure and is described in detail, for example, in JP-A-5-203946.

[Image Display Device Other than Liquid Crystal Display Device]

(PDP)

The plasma display panel (PDP) is generally composed of a gas, a glass substrate, an electrode, an electrode lead material, a thick print material and a fluorescent material. As for the glass substrate, two sheets of front glass substrate and rear glass substrate are used. An electrode and an insulating layer are formed on the two glass substrates, and a fluorescent material layer is further formed on the rear glass substrate. The two glass substrates are assembled, and a gas is sealed therebetween.

The plasma display panel (PDP) is already available on the market. The plasma display panel is described in JP-A-5-205643 and JP-A-9-306366.

In some cases, a front panel is disposed on the front surface of the plasma display panel. The front panel preferably has sufficiently high strength for protecting the plasma display panel. The front panel may be disposed with spacing from the plasma display panel or may be laminated directly to the plasma display body. In an image display device like the plasma display panel, the antireflection film can be laminated directly to the display surface. In the case where a front panel is provided in front of the display, the antireflection film may be laminated to the front side (outer side) or back side (display side) of the front panel.

(Touch Panel)

The optical film of the present invention can be applied to a touch panel and the like described, for example, in JP-A-5-127822 and JP-A-2002-48913.

(Organic EL Device)

The optical film of the present invention can be used as a protective film of an organic EL device or the like.

In the case of using the optical film of the present invention for an organic EL device or the like, the contents described, for example, in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617 and JP-A-2002-056976 may be applied. Furthermore, the contents described in JP-A-2001-148291, JP-A-2001-221916 and JP-A-2001-231443 are preferably used in combination.

EXAMPLES

Preparation of Transparent Support

A base layer dope and a surface layer dope are produced according to the dope formulation shown in Table 1 and cast under the conditions shown in Table 2 to prepare Transparent Supports 1 to 18. The stacking form of surface layer and base layer is the same as that shown in FIG. 1. The support is dried with hot air at 100° C. until the residual solvent amount becomes 10 mass %, and then dried with hot air at 140° C. for 10 minutes. All of the refractive indices of the transparent supports are 1.48.

TABLE 1

| Composition | | Base Layer Dope | | | | | | | | | | | | Surface Layer Dope | |
|---|---|---|---|---|---|---|---|---|---|---|---|---|---|---|---|
| | | A | B | C | D | E | F | G | H | I | J | K | L | M | N |
| Solid content composition (20 mass % of dope solution) | Cellulose triacetate concentration (mass %) | 84.4 | 86.7 | 86.5 | 82.6 | 69.6 | 65.2 | 81 | 75.9 | 78.9 | 78.3 | 85.1 | 77 | 97 | 77.6 |
| | Triphenyl phosphate (mass %) | 12.6 | 13 | 13 | 12.4 | 10.4 | 9.8 | 12 | 11.1 | 11.1 | 12.7 | 12.9 | 13 | 3 | 2.4 |
| | Fine particle (average particle diameter) (mass %) SSX-106TN (6 μm) | 3 | — | — | — | — | — | — | — | — | — | — | — | — | 20 |
| | MX800 (8 μm) | — | 0.3 | 0.5 | 5 | 20 | 25 | — | — | — | — | — | — | — | — |
| | MBX-12 (12 μm) | — | — | — | — | — | — | 7 | — | — | — | — | — | — | — |
| | MX-1500H (15 μm) | — | — | — | — | — | — | — | 13 | — | — | — | — | — | — |
| | MX-2000 (20 μm) | — | — | — | — | — | — | — | — | 10 | — | — | — | — | — |
| | MX150 (1.5 μm) | — | — | — | — | — | — | — | — | — | 9 | — | — | — | — |
| | SSX-106FB (6 μm) | — | — | — | — | — | — | — | — | — | — | 2 | — | — | — |
| | SX350H (3.5 μm) | — | — | — | — | — | — | — | — | — | — | — | 10 | — | — |
| Solvent composition | Methylene chloride (mass %) | 90 | 90 | 90 | 90 | 90 | 90 | 90 | 90 | 90 | 90 | 90 | 90 | 90 | 90 |
| | Methanol (mass %) | 10 | 10 | 10 | 10 | 10 | 10 | 10 | 10 | 10 | 10 | 10 | 10 | 10 | 10 |

TABLE 2

| | Casting Mode | Dope Formulation | | | Film Thickness (μm) | | | Light-transmitting Particles in Entire Solid Content (mass %) |
|---|---|---|---|---|---|---|---|---|
| | | Base Layer | Surface Layer-1 | Surface Layer-2 | Base Layer | Surface Layer-1 | Surface Layer-2 | |
| Transparent Support 1 | single-layer casting | A | — | — | 80 | — | — | 3 |
| Transparent Support 2 | co-casting | A | M | N | 44 | 8 | 8 | 4.9 |
| Transparent Support 3 | sequential casting | A | M | N | 44 | 8 | 8 | 4.9 |
| Transparent Support 4 | co-casting | B | M | N | 60 | 10 | 10 | 2.7 |
| Transparent Support 5 | co-casting | C | M | N | 50 | 5 | 5 | 2.1 |
| Transparent Support 6 | co-casting | D | M | N | 44 | 8 | 8 | 6.3 |
| Transparent Support 7 | co-casting | E | M | N | 28 | 6 | 6 | 17 |
| Transparent Support 8 | co-casting | F | M | M | 48 | 6 | 6 | 20 |
| Transparent Support 9 | co-casting | G | M | N | 72 | 4 | 4 | 7.3 |
| Transparent Support 10 | co-casting | H | M | N | 44 | 8 | 8 | 12.2 |
| Transparent Support 11 | co-casting | I | M | N | 44 | 8 | 8 | 10 |
| Transparent Support 12 | co-casting | J | M | N | 72 | 14 | 14 | 9.3 |
| Transparent Support 13 | co-casting | K | M | N | 72 | 14 | 14 | 4.2 |
| Transparent Support 14 | co-casting | L | M | N | 64 | 8 | 8 | 10 |
| Transparent Support 15 | co-casting | A | N | N | 64 | 8 | 8 | 6.4 |
| Transparent Support 16 | co-casting | A | M | M | 48 | 6 | 6 | 2.4 |
| Transparent Support 17 | co-casting | C | M | M | 50 | 5 | 5 | 0.4 |
| Transparent Support 18 | co-casting | F | N | N | 48 | 6 | 6 | 24 |

| | Ra (μm) | Surface Haze (%) | Internal Haze (%) | Transmitted Image Clarity (%) | I(0°)/I0 (%) | I(5°)/I0 (%) | I(30°)/I0 (%) |
|---|---|---|---|---|---|---|---|
| Transparent Support 1 | 0.05 | 1.9 | 28 | 59 | 62 | 2.2 | 0.0012 |
| Transparent Support 2 | 0.02 | 0.4 | 15 | 69 | 73 | 1.5 | 0.0008 |
| Transparent Support 3 | 0.02 | 0.4 | 15 | 69 | 73 | 1.5 | 0.0008 |
| Transparent Support 4 | 0.02 | 0.4 | 3 | 77 | 82 | 0.7 | 0.0004 |
| Transparent Support 5 | 0.02 | 0.4 | 5 | 68 | 79 | 1 | 0.0007 |
| Transparent Support 6 | 0.02 | 0.4 | 24 | 55 | 65 | 1.9 | 0.0011 |
| Transparent Support 7 | 0.03 | 0.8 | 29 | 50 | 60 | 2.5 | 0.0015 |
| Transparent Support 8 | 0.04 | 1.2 | 37 | 42 | 58 | 3.6 | 0.0021 |
| Transparent Support 9 | 0.02 | 0.4 | 28 | 55 | 62 | 2.2 | 0.0014 |
| Transparent Support 10 | 0.03 | 0.9 | 29 | 60 | 61 | 2.2 | 0.0015 |
| Transparent Support 11 | 0.04 | 1.3 | 23 | 70 | 66 | 2 | 0.0013 |
| Transparent Support 12 | 0.01 | 0.3 | 51 | 72 | 45 | 3.7 | 0.0960 |
| Transparent Support 13 | 0.02 | 0.4 | 28 | 68 | 62 | 2.3 | 0.0013 |
| Transparent Support 14 | 0.01 | 0.3 | 35 | 65 | 56 | 1.5 | 0.0070 |
| Transparent Support 15 | 0.15 | 7.4 | 32 | 36 | 61 | 1.7 | 0.0010 |
| Transparent Support 16 | 0.02 | 0.3 | 17 | 65 | 73 | 1.6 | 0.0009 |
| Transparent Support 17 | 0.01 | 0.1 | 1.3 | 98 | 95 | 0.05 | 0.0000 |
| Transparent Support 18 | 0.13 | 7.5 | 47 | 18 | 55 | 4.8 | 0.0031 |

SSX-106TN:
Crosslinked polymethyl methacrylate particle, refractive index: 1.49, produced by Sekisui Plastics Co., Ltd.
MX800:
Crosslinked polymethyl methacrylate particle, refractive index: 1.49, produced by Soken Chemical & Engineering Co., Ltd.
MBX-12:
Crosslinked polymethyl methacrylate particle, refractive index: 1.49, produced by Sekisui Plastics Co., Ltd.
MX1500H:
Crosslinked polymethyl methacrylate particle, refractive index: 1.49, produced by Soken Chemical & Engineering Co., Ltd.
MX2000:
Crosslinked polymethyl methacrylate particle, refractive index: 1.49, produced by Soken Chemical & Engineering Co., Ltd.
MX150:
Crosslinked polymethyl methacrylate particle, refractive index: 1.49, produced by Soken Chemical & Engineering Co., Ltd.
SSX-106FB:
Crosslinked polymethyl methacrylate particle, refractive index: 1.54, produced by Sekisui Plastics Co., Ltd.
SX350H:
Crosslinked polystyrene particle, refractive index: 1.59, produced by Soken Chemical & Engineering Co., Ltd.
[Evaluation of Transparent Support]
Antireflection Films (Transparent Support 1) to (Transparent Support 18) produced were evaluated as follows. The evaluation results are shown in Table 2.
[Measurement of Surface Roughness (Ra)]
The arithmetic average roughness (Ra) (μm) is measured according to JIS B0601 (1994, 2001) by using SURF-CORDER MODEL SE-3F manufactured by Kosaka Laboratory Ltd.
As for the surface measured, in the case of only a base layer, both surfaces are measured and the value of the surface having a larger Ra is employed. In the case of having a surface layer, the support on the surface layer-1 side is measured.
Measurement conditions are an evaluation length of 2.5 mm, a cutoff value of 0.25 mm, a speed of 0.5 mm/s, a stylus diameter of 2 μm and a weight of 30 μN.
[Transmitted Image Clarity]
The transmitted image clarity is measured according to JIS-K7105 by using an optical comb with a slit width of 2.0 mm of an image clarity meter (Model ICM-2D) manufactured by Suga Test Instruments Co., Ltd.
[Haze]
[1] The entire haze value (H) of the film obtained is measured according to JIS-K7136.
[2] After adding several linseed oil drops on the front and back surfaces of the film obtained, the film is sandwiched from front and back by two 1 mm-thick glass plates (Microslide Glass No. S9111, produced by Matsunami K. K.), the haze is measured in a surface haze-removed state by bringing the two glass plates into complete contact with the film obtained, and the value obtained by subtracting, from this haze, the haze separately measured by interposing only silicone oil between two glass plates is calculated as the internal haze (Hi).
[3] The value obtained by subtracting the internal haze (Hi) calculated in [2] above from the entire haze (H) measured in [1] above is calculated as the surface haze (Hs).

Figure 8:
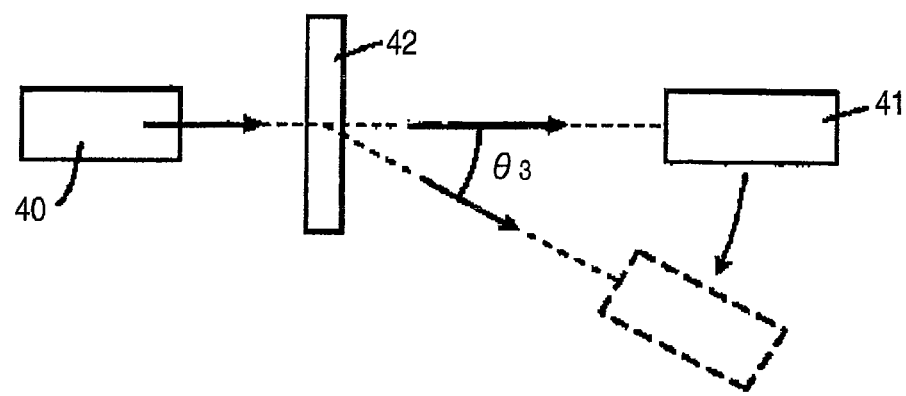
FIG. 8 is a schematic view for explaining the method of measuring the intensity of transmitted and scattered light,
wherein 1 denotes Base layer, 2 denotes Surface layer, 3 denotes Light-transmitting particle, 4 denotes Transparent support; 11 denotes Stirring machine, 12 denotes Transfer pump, 13 denotes Filtration device, 14 denotes Stock tank, 15 denotes Casting liquid-feed pump, 16 denotes Additive injection pump, 17 denotes Casting die, 18 denotes Casting band, 19 denotes Reduced pressure chamber, 20 denotes Casting drum, 30 denotes Casting die, 32 denotes Manifold, 33 denotes Manifold, 34 denotes Feed block, 40 denotes Light source, 41 denotes Detector, 42 denotes Sample (optical film), and 03 denotes Angle from normal direction.

[I(0°)/I0, I(5°)/I0 and I(30°)/I0]
The obtained film is measured using an automatic goniophotometer (Model GP-5) manufactured by Murakami Color Research Laboratory (see, FIG. 8). Each film is measured at different positions apart by 1 cm or more and after performing the measurement three times at each position and averaging the values, the outgoing light intensities at 0°, 5° and 30° from the normal direction of the film back surface are designated as I(0°), I(5°) and I(30°), respectively. Also, a 80 μm-thick triacetyl cellulose film "FUJITAC TD80UF" produced by Fujifilm Corp. is measured in the same manner, and assuming that the outgoing light intensity at 0° from the normal direction of the film back surface is I0, I(0°)/I0, I(5°)/I0 and I(30°)/I0 are determined.
[Preparation of Coating Solution for Hardcoat Layer]
The components shown below are charged into a mixing tank and after stirring, the resulting solution is filtered through a polypropylene-made filter having a pore size of 30 μm to prepare the coating solution.
{Preparation of Coating Solution (HCL-1) for Hardcoat Layer}

| PET-30 | 48.5 parts by mass |
| IRGACURE 127 | 1.5 parts by mass |
| Methyl isobutyl ketone | 35.0 parts by mass |
| Methyl ethyl ketone | 15.0 parts by mass |

{Preparation of Coating Solution (HCL-2) for Hardcoat Layer}

| PET-30 | 45.5 parts by mass |
| SX350H | 3.0 parts by mass |
| IRGACURE 127 | 1.5 parts by mass |
| Methyl isobutyl ketone | 35.0 parts by mass |
| Methyl ethyl ketone | 15.0 parts by mass |

The components above are as follows.
PET-30:
A mixture of pentaerythritol triacrylate and pentaerythritol tetraacrylate [produced by Nippon Kayaku Co., Ltd.].
IRGACURE 127:
A photopolymerization initiator, produced by Ciba Specialty Chemicals Corp.
[Preparation of Coating Solution for Low Refractive Index Layer]
(Preparation of Sol Solution a)
In a reaction vessel equipped with a stirrer and a reflux condenser, 120 parts by mass of methyl ethyl ketone, 100 parts by mass of acryloxypropyltrimethoxysilane "KBM-5103" {produced by Shin-Etsu Chemical Co., Ltd.} and 3 parts by mass of diisopropoxyaluminum ethyl acetate are added and mixed and after adding 30 parts by mass of ion-exchanged water, the reaction is allowed to proceed at 60° C. for 4 hours. The reaction solution is then cooled to room temperature to obtain Sol Solution a. The mass average molecular weight is 1,800 and out of the oligomer or higher components, the proportion of the components having a molecular weight of 1,000 to 20,000 is 100 mass %. Also, from the gas chromatography analysis, the raw material acryloxypropyltrimethoxysilane is found not to remain at all.
{Preparation of Hollow Silica Fine Particle Liquid Dispersion (A-1)}
30 Parts by mass of acryloyloxypropyltrimethoxysilane "KBM-5103" {produced by Shin-Etsu Chemical Co., Ltd.} and 1.5 parts by mass of diisopropoxyaluminum ethyl acetate "Kerope EP-12" {produced by Hope Chemical Co., Ltd.} are added to 500 parts by mass of a hollow silica fine particle sol (particle diameter: approximately from 40 to 50 nm, thickness of shell: from 6 to 8 nm, refractive index: 1.31, solid content concentration: 20 mass %, main solvent: isopropyl alcohol, prepared according to Preparation Example 4 of JP-A-2002-79616 by changing the particle size) and mixed, and 9 parts by mass of ion-exchanged water is added thereto. After allowing the reaction to proceed at 60° C. for 8 hours, the reaction solution is cooled to room temperature, and 1.8 parts of acetyl acetone is added to obtain Hollow Silica Liquid Dispersion (A-1). The solid content concentration in the obtained hollow silica liquid dispersion is 18 mass % and the refractive index after drying the solvent is 1.31.

{Preparation of Coating Solution (LL-1) for Low Refractive Index Layer}

44.0 Parts by mass of Fluorine-Containing Copolymer (P-3) (mass average molecular weight: about 50,000) described in JP-A-2004-45462, 6.0 parts by mass of a mixture of dipentaerythritol pentaacrylate and dipentaerythritol hexaacrylate "DPHA" {produced by Nippon Kayaku Co., Ltd.}, 3.0 parts by mass of terminal methacrylate group-containing silicone "RMS-033" produced by Gelest), and 3.0 parts by mass of "IRGACURE 907" {produced by Ciba Specialty Chemicals Corp.} are added to 100 parts by mass of methyl ethyl ketone and dissolved. Thereafter, 195 parts by mass of Hollow Silica Fine Particle Liquid Dispersion (A-1) (39.0 parts by mass as the solid content of silica+surface treating agent) and 17.2 parts by mass (5.0 parts by mass as the solid content) of Sol Solution a are added. The resulting solution is diluted with cyclohexane and methyl ethyl ketone such that the solid content concentration in the entire coating solution becomes 6 mass % and the ratio between cyclohexane and methyl ethyl ketone becomes 10:90, whereby Coating Solution (LL-1) for Low Refractive Index Layer is prepared.

[Coating of Hardcoat Layer]

Using the slot die coater shown in FIG. 1 of JP-A-2003-211052, Transparent Supports 1 to 18 prepared each is unrolled, and Coating Solution (HCL-1, HCL-2) for Hardcoat Layer is coated thereon to have a dry thickness shown in Table 3 below and dried at 30° C. for 15 seconds and further at 90° C. for 20 seconds. Thereafter, the coating layer is cured by irradiating an ultraviolet ray at an irradiation dose of 70 mJ/cm² with use of "Air-Cooled Metal Halide Lamp" {manufactured by Eye Graphics Co., Ltd.} of 160 W/cm under nitrogen purging to produce Antireflection Films (HC-1) to (HC-19), and each film is then taken up. The hardcoat layer is coated on the surface of the surface layer-1 side. All of the refractive indices of the hardcoat layers are 1.52.

TABLE 3

| | | Average Particle Diameter (μm) | Coating Solution for Hardcoat Layer | Thickness of Hardcoat Layer (μm) | Constrast | Glare | Reflection of Three Band Fluorescent Lamp | Example/Comparative Example |
|---|---|---|---|---|---|---|---|---|
| HC-1 | Transparent Support 1 | 6 | HCL-1 | 6 | B | B | A | Example |
| HC-2 | Transparent Support 2 | 6 | HCL-1 | 6 | B | B | A | Example |
| HC-3 | Transparent Support 3 | 6 | HCL-1 | 6 | B | B | A | Example |
| HC-4 | Transparent Support 4 | 8 | HCL-1 | 6 | A | D | B | Comparative Example |
| HC-5 | Transparent Support 5 | 8 | HCL-1 | 6 | A | B | A | Example |
| HC-6 | Transparent Support 5 | 8 | HCL-2 | 6 | B | B | A | Example |
| HC-6-L | Transparent Support 5 | 8 | HCL-2 | 6 | A | B | A | Example |
| HC-7 | Transparent Support 6 | 8 | HCL-1 | 15 | C | A | A | Example |
| HC-8 | Transparent Support 7 | 8 | HCL-1 | 3 | B | B | A | Example |
| HC-9 | Transparent Support 8 | 8 | HCL-1 | 6 | D | B | A | Comparative Example |
| HC-10 | Transparent Support 9 | 12 | HCL-1 | 6 | B | B | A | Example |
| HC-11 | Transparent Support 10 | 15 | HCL-1 | 6 | B | A | A | Example |
| HC-12 | Transparent Support 11 | 20 | HCL-1 | 6 | B | B | A | Example |
| HC-13 | Transparent Support 12 | 1.5 | HCL-1 | 6 | D | C | B | Comparative Example |
| HC-14 | Transparent Support 13 | 6 | HCL-1 | 6 | B | B | A | Example |
| HC-15 | Transparent Support 14 | 3.5 | HCL-1 | 6 | B | D | A | Comparative Example |
| HC-16 | Transparent Support 15 | 6 | HCL-1 | 6 | C | D | A | Comparative Example |
| HC-17 | Transparent Support 16 | 6 | HCL-1 | 6 | B | B | A | Example |
| HC-18 | Transparent Support 15 | 6 | HCL-1 | 6 | A | B | B | Comparative Example |
| HC-19 | Transparent Support 16 | 6 | HCL-1 | 6 | D | D | A | Comparative Example |

[Coating of Low Refractive Index Layer]

Coating Solution (LL-1) for Low Refractive Index Layer is wet-coated on the hardcoat layer of Antireflection Film (HC-6) by using the slot die coater shown in FIG. 1 of JP-A-2003-211052 to give a low refractive index layer having a dry thickness of 90 nm, dried at 60° C. for 50 seconds and then irradiated with an ultraviolet ray at an irradiation dose of 600 mJ/cm² by using "Air-Cooled Metal Halide Lamp" {manufactured by Eye Graphics Co., Ltd.} of 240 W/cm in an atmosphere having an oxygen concentration of 100 ppm under nitrogen purging to form a low refractive index layer (refractive index: 1.35), and the resulting film is taken up. In this way, Antireflection Film (HC-6-L) is produced.

[Evaluation of Antireflection Film]

Antireflection Films (HC-1) to (HC-19) and (HC-6-L) are evaluated as follows. The evaluation results are shown in Table 3.

[Average Particle Diameter]

The produced antireflection film is transmitted and photographed at a magnification of 5,000 by an electron microscope "S-3400N" {manufactured by Hitachi High-Technologies Corp.}. From the particles photographed, 10 particles are randomly selected and the average value of diameters of 10 particles is taken as the average particle diameter. As for the HC-6 and HC-6-L, 10 particles excluding a particle of 3 to 4 μm are selected, and the average value of diameters of 10 particles is taken as the average particle diameter.

[Thickness of Hardcoat Layer]

The cross-section of the produced antireflection film is photographed at a magnification of 5,000 by an electron microscope "S-3400N" {manufactured by Hitachi High-Technologies Corp.}. The thickness of the hardcoat layer is measured randomly at 10 points and an average value is derived therefrom. This operation is performed for three visual fields, and the average value thereof is taken as the average thickness of the hardcoat layer.

[Production of Polarizing Plate]

A polarizing film is produced by adsorbing iodine to a stretched polyvinyl alcohol film. Antireflection Films (HC-1) to (HC-19) and (HC-6-L) each is saponified and laminated to one side of the polarizing film by using a polyvinyl alcohol-based adhesive such that the cellulose triacetate side of each antireflection film comes to the polarizing film side. Also, a commercially available cellulose triacetate film "FUJITAC TD80UF" {produced by Fujifilm Corp.} is laminated to the polarizing film surface opposite the side where the antireflection film is laminated, by using a polyvinyl alcohol-based adhesive. In this way, Polarizing Plates (HKH-01) to (HKH-19) and (HKH-16-L) with antireflection film are produced.

[Evaluation of Polarizing Plate with Antireflection Film]

[Glare]

The polarizing plate on the viewing side of a 32-type full-spec high vision liquid crystal TV "LC-32GS10" {manufactured by Sharp Corp.} is removed, and Polarizing Plates (HKH-01) to (HKH-19) and (HKH-16-L) each is laminated instead to the viewing side through an adhesive such that the antireflection film becomes the outermost surface.

The glaring of the screen when the liquid crystal TV is lighted and displayed in white is evaluated by three persons. The level of C or higher is judged as "passed".

A: Glaring is not generated.
B: Glaring is slightly recognized with an eye by one person but of no problem in practice.
C: Glaring is recognized with an eye by three persons but of no problem in practice.
D: Glaring is strongly generated and annoying.

(Contrast)

The polarizing plate on the viewing side of a 32-type full-spec high vision liquid crystal TV "LC-32GS10" {manufactured by Sharp Corp.} is removed, and Polarizing Plates (HKH-01) to (HKH-19) and (HKH-16-L) each is laminated instead to the viewing side through an adhesive such that the antireflection film becomes the outermost surface. Then, a light receiver (SPECTRORADIOMETER CS1000A, manufactured by MINOLTA) is set to lie in parallel at 50 cm above the panel laminated with the polarizing plate. Under dark room conditions, the image on the panel is switched between black display and white display, and the brightness at black display and the brightness at white display in the center portion of the polarizing plate are measured as black brightness and white brightness, respectively. Based on the values obtained, the contrast ratio (white brightness/black brightness) is calculated.

A contrast ratio of 2,100 or more is rated A, a contrast ratio of 2,000 or more is rated B, a contrast ratio of 1,800 to less than 2,000 is rated C, and a contrast ratio of less than 1,800 is rated D.

(Reflection of Three Band Fluorescent Lamp)

The polarizing plate on the viewing side of a 37-type full-spec high vision liquid crystal TV "LC-37DS3" {manufactured by Sharp Corp.} is removed, and Polarizing Plates (HKH-01) to (HKH-19) and (HKH-16-L) each is laminated instead to the viewing side through an adhesive such that the antireflection film becomes the outermost surface. A three band fluorescent lamp is reflected on the panel laminated with the polarizing plate under dark room conditions, and reflection is evaluated at the edge part of the reflected fluorescent lamp. The level of A or higher is judged as "passed". A: Rainbow unevenness is not generated in the edge part of the reflected fluorescent lamp; and B: rainbow unevenness is generated in the edge part of the reflected fluorescent lamp.

As apparent from the results in Table 3, in the case of the film of the present invention, an optical film realizing high contrast and no generation of glaring and ensuring that when a three band fluorescent lamp is reflected under dark room conditions, rainbow unevenness is not generated in the reflected light, can be obtained.

Also, after removing the polarizing plate on the backlight side of the liquid crystal TV above, Polarizing Plate (HKH-08) is laminated instead through an adhesive and at the same time, one light diffusing sheet disposed on the liquid crystal cell side of the backlight unit is removed, whereby a liquid crystal display device is produced. This liquid crystal display device is caused to display an entire halftone screen (128/256 gradation) by a video signal generating device, as a result, uniform display free from unevenness, moire or the like of the backlight can be obtained. On the other hand, when a liquid crystal display device is produced by using the commercially available polarizing plate as it is, without replacing the polarizing plate by Polarizing Plate (HKH-08), and removing one light diffusing sheet disposed on the liquid crystal cell side of the backlight unit, light-dark unevenness in the transverse direction or moire due to the backlight source is slightly confirmed and the display is not uniform.

Furthermore, a liquid crystal display device is produced by replacing the polarizing plate on both the viewing side and the backlight side of the liquid crystal TV by Polarizing Plate (HKH-08) and at the same time, removing one light diffusing sheet disposed on the liquid crystal cell side of the backlight unit and caused to display an entire halftone screen in the same manner, as a result, uniform display without unevenness can be obtained. Also, in the state of entire black display, a three band fluorescent lamp is reflected under dark room conditions, but rainbow unevenness of reflected light is not generated. As understood from these results, the optical film of the present invention is effective not only when used on the outermost surface of an image display device but also when used in the inside of an image display device and at the same time, can realize reduction in the number of members.

Furthermore, the optical film of the present invention can be suitably used for an optical film of a polarizing plate or the like by using an adhesive or binding material, and an image display device mounted with the optical film has a display contrast property and is free from generation of glaring and rainbow unevenness of reflected light, so that the display device can be suitably used even as a household television set.

According to the present invention, a transparent support capable of preventing glare and ensuring good contrast ratio when disposed in an image display device, and an optical film and a polarizing plate each using the transparent support, can be provided. Also, according to the present invention, an image display device assured of good visibility by having the transparent support, optical film or polarizing plate of the present invention can be provided. Furthermore, when the optical film of the present invention is used for a liquid crystal display device (LCD), even if a three band fluorescent lamp is reflected on the display surface, rainbow unevenness can be hardly generated. In addition, the present invention can contribute to reduction in the number of members at the production of an image display device.

The entire disclosure of each and every foreign patent application from which the benefit of foreign priority has been claimed in the present application is incorporated herein by reference, as if fully set forth.

What is claimed is:

1. A transparent support comprising:
    a light-transmitting particle having an average particle diameter of 6 to 20 μm, wherein
    the transparent support has a thickness of from 20 to 200 μm, the light-transmitting particle is contained in a ratio of 0.5 to 20 mass % based on entire solid content in the transparent support, and the transparent support has an arithmetic average roughness (Ra) of 0.05 μm or less, wherein the transparent support is a cellulose acylate film.

2. The transparent support as claimed in claim 1, wherein a difference between a refractive index of the light-transmitting particle and a refractive index of the transparent support is from 0.001 to 0.05.

3. The transparent support as claimed in claim 1, wherein a haze value attributable to an interior of the transparent support is from 10 to 30%, and a haze value attributable to a surface of the transparent support is less than 2%.

4. The transparent support as claimed in claim 1, wherein assuming that an outgoing light intensity of transmitted and scattered light in a normal direction of a transparent support not containing a light-transmitting particle is 10, 1(0°)/I0 which is a ratio of 1(0°) to IO is from 40 to 98%, wherein 1(0°) is an outgoing light intensity in a normal direction of a surface of the transparent support comprising the light-transmitting particle having the average particle diameter of 6 to 20 μm, 1(5°)/I0 which is a ratio of 1(5°) to IO is from 0.7 to 5.5%, wherein 1(5°) is an outgoing light intensity at a position 5° inclined to a longitudinal direction of a film from the normal direction of the surface of the transparent support comprising the light-transmitting particle having the average particle diameter of 6 to 20 μm, and 1(30°)/I0 which is a ratio of 1(30°) to 10 is from 0.0005 to 0.003%, wherein) 1(30°) is an outgoing light intensity at a position 30° inclined to the longitudinal direction of the film from the normal direction of the surface of the transparent support comprising the light-transmitting particle having the average particle diameter of 6 to 20 μm.

5. The transparent support as claimed in claim 1, wherein a transmitted image clarity by an optical comb of 2.0 mm is from 40 to 70%.

6. An optical film comprising:
the transparent support claimed in claim 1; and
a hardcoat layer having a thickness of 3 to 15 μm.

7. The optical film as claimed in claim 6, further comprising: a low refractive index layer having a refractive index lower than a refractive index of the hardcoat layer.

8. The optical film as claimed in claim 7, wherein
the low refractive index layer contains a fine particle, which is at least one selected from the group consisting of an inorganic fine particle, a hollow inorganic fine particle and a hollow organic resin fine particle.

9. The optical film as claimed in claim 6, wherein the hardcoat layer does not contain a particle having an average particle diameter of 6 μm or more.

10. The optical film as claimed in claim 6, wherein the refractive index of the hardcoat layer is from 11.45 to 1.55.

11. A polarizing plate comprising:
a polarizing film; and
protective films on both sides of the polarizing film, wherein
at least one of the protective films is the transparent support claimed in claim 1.

12. An image display device comprising: the transparent support claimed in claim 1.

13. A transparent support comprising:
a cellulose acylate film containing a light-transmitting particle having an average particle diameter of 6 to 20 μm, wherein
the transparent support has a thickness of from 20 to 200 μm,
the light-transmitting particle is contained in a ratio of 0.5 to 20 mass % based on entire solid content in the transparent support,
the transparent support has an arithmetic average roughness (Ra) of 0.05 μm or less,
a difference between a refractive index of the light-transmitting particle and a refractive index of the transparent support is from 0.001 to 0.05,
the cellulose acylate film has a multilayer structure comprising a base layer and a surface layer,
the light-transmitting particle is contained only in the base layer,
a haze value attributable to an interior of the transparent support is from 10 to 30%, and
a haze value attributable to a surface of the transparent support is less than 2%.

14. A transparent support comprising:
a light-transmitting particle having an average particle diameter of 6 to 20 μm, wherein
the transparent support has a thickness of from 20 to 200 μm,
the light-transmitting particle is contained in a ratio of 0.5 to 20 mass % based on entire solid content in the transparent support, and
the transparent support has an arithmetic average roughness (Ra) of 0.05 μm or less,
wherein the transparent support is a cellulose acylate film,
wherein the cellulose acylate film has a multilayer structure comprising a base layer and a surface layer, and the light-transmitting particle is contained only in the base layer.

15. The transparent support as claimed in claim 14, wherein a difference between a refractive index of the light-transmitting particle and a refractive index of the transparent support is from 0.001 to 0.05.

16. The transparent support as claimed in claim 14, wherein a haze value attributable to an interior of the transparent support is from 10 to 30%, and
a haze value attributable to a surface of the transparent support is less than 2%.

* * * * *